Figure 1:
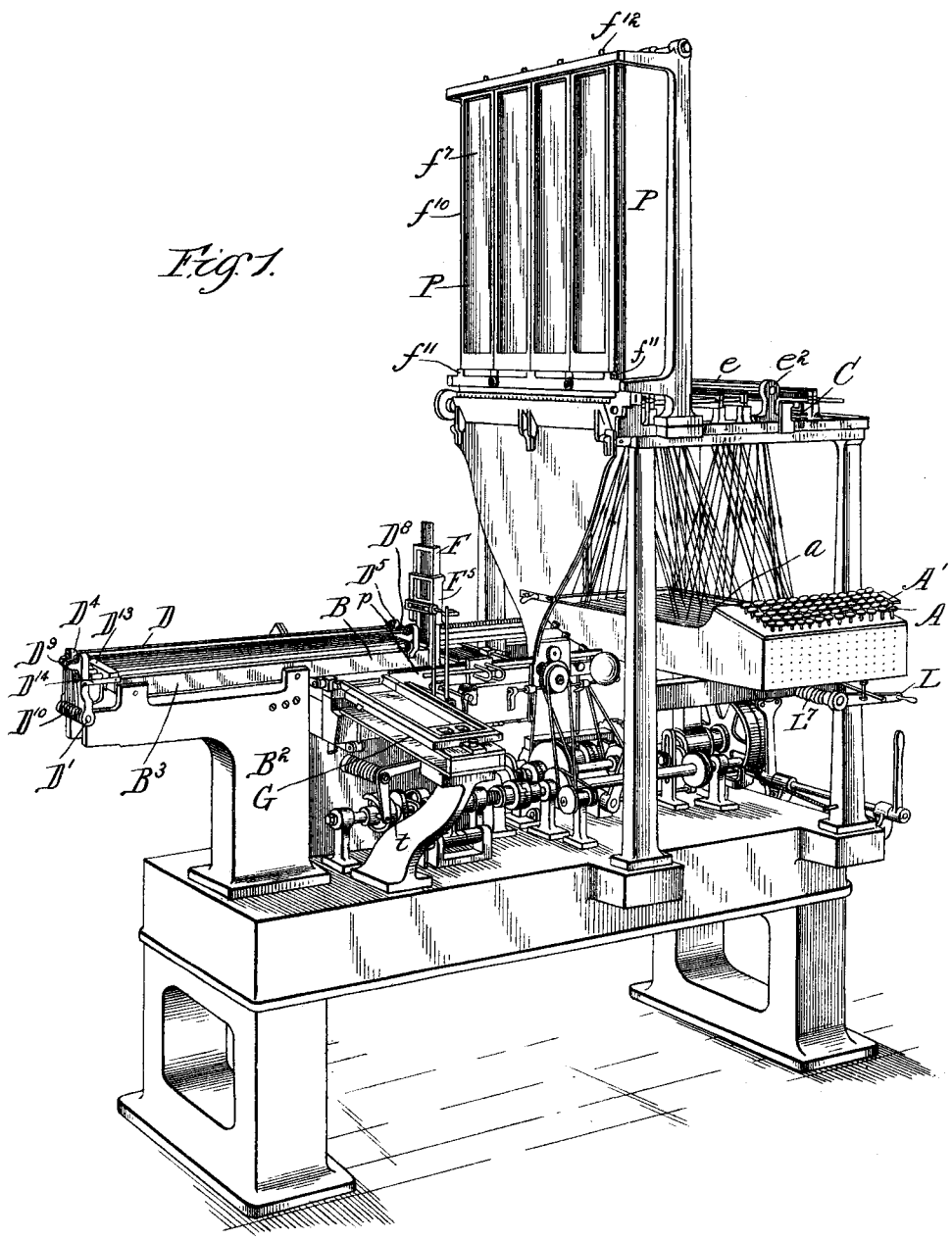

(No Model.)

F. B. CONVERSE, Jr.

TYPE SETTING AND JUSTIFYING MACHINE.

No. 601,706. Patented Apr. 5, 1898.

(No Model.) F. B. CONVERSE, Jr. 12 Sheets—Sheet 3.
TYPE SETTING AND JUSTIFYING MACHINE.
No. 601,706. Patented Apr. 5, 1898.

(No Model.) 12 Sheets—Sheet 5.

F. B. CONVERSE, Jr.
TYPE SETTING AND JUSTIFYING MACHINE.

No. 601,706. Patented Apr. 5, 1898.

Witnesses.
Louis P. Abell
Cyrus S. Bates

Inventor.
Francis B. Converse Jr.
By his Attorney
Albert H. Bates

THE NORRIS PETERS CO., PHOTO-LITHO., WASHINGTON, D. C.

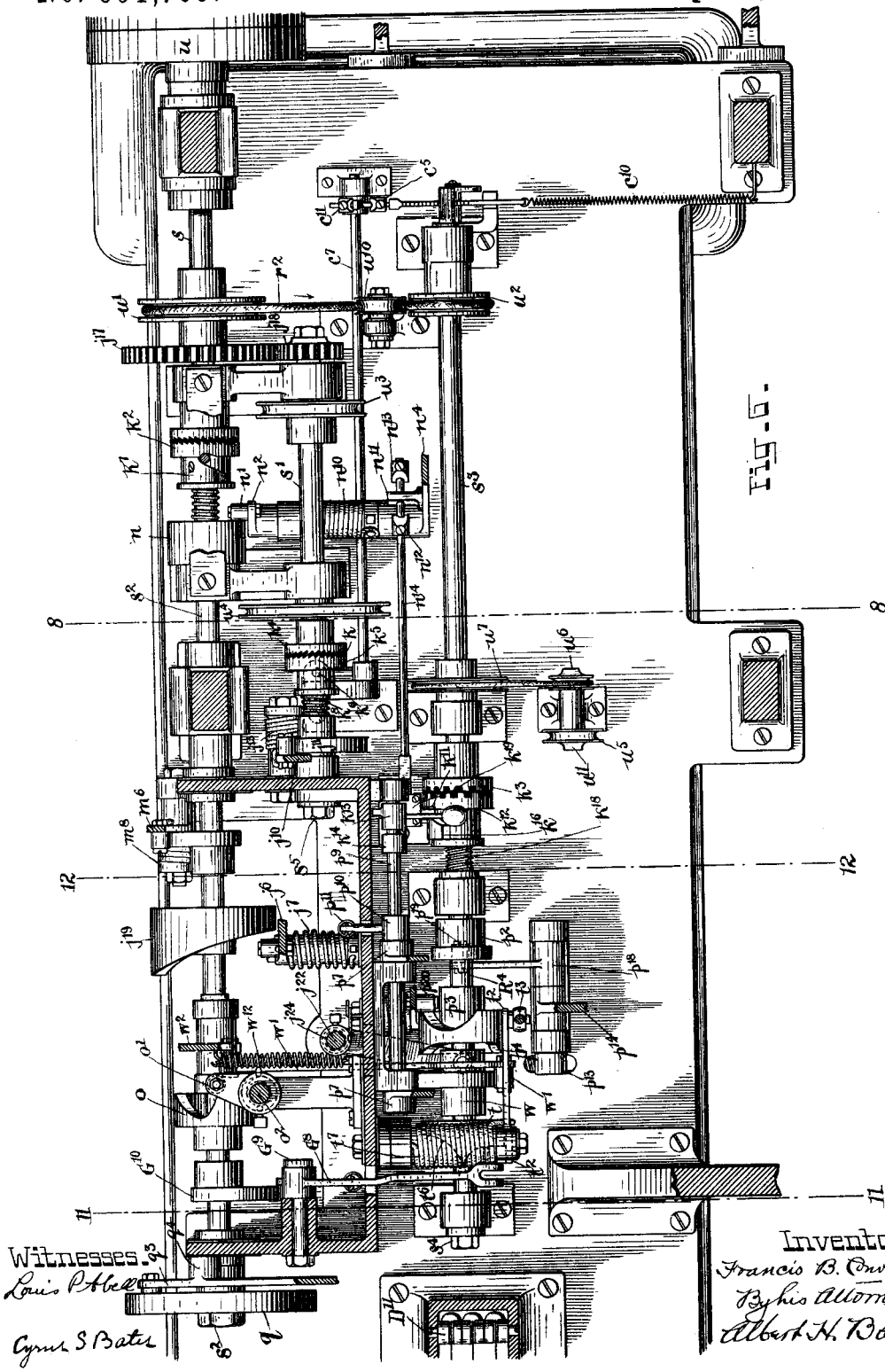

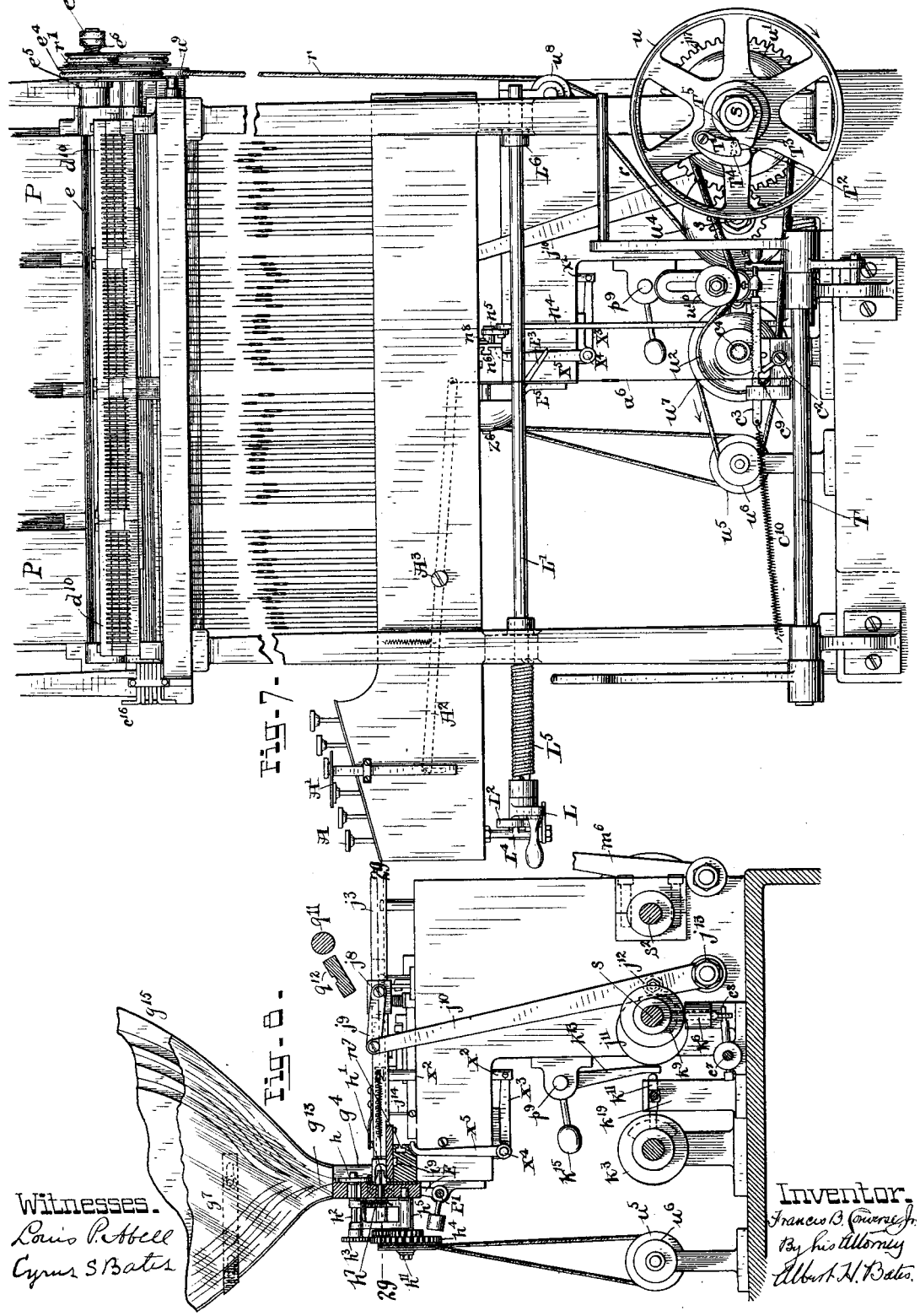

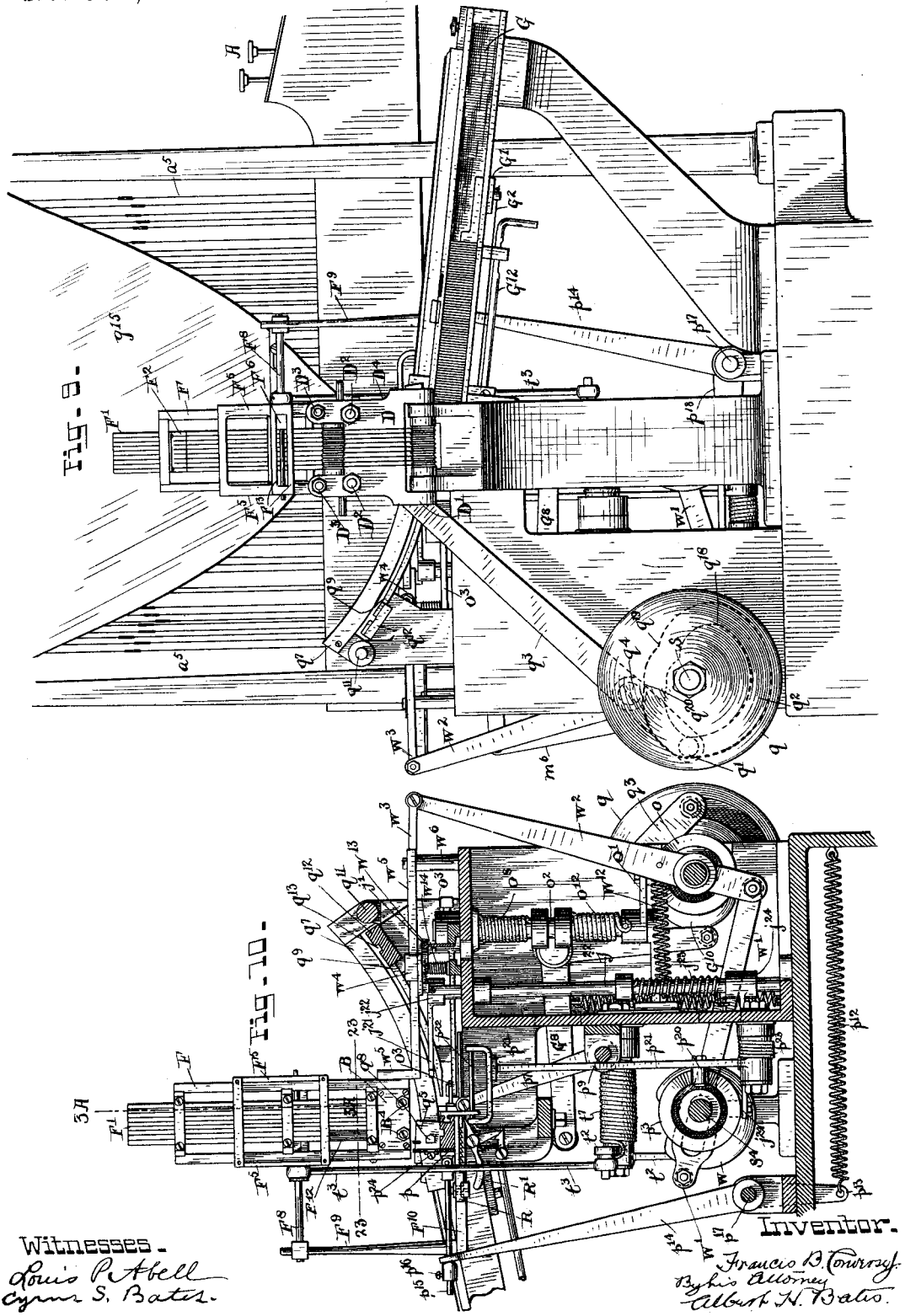

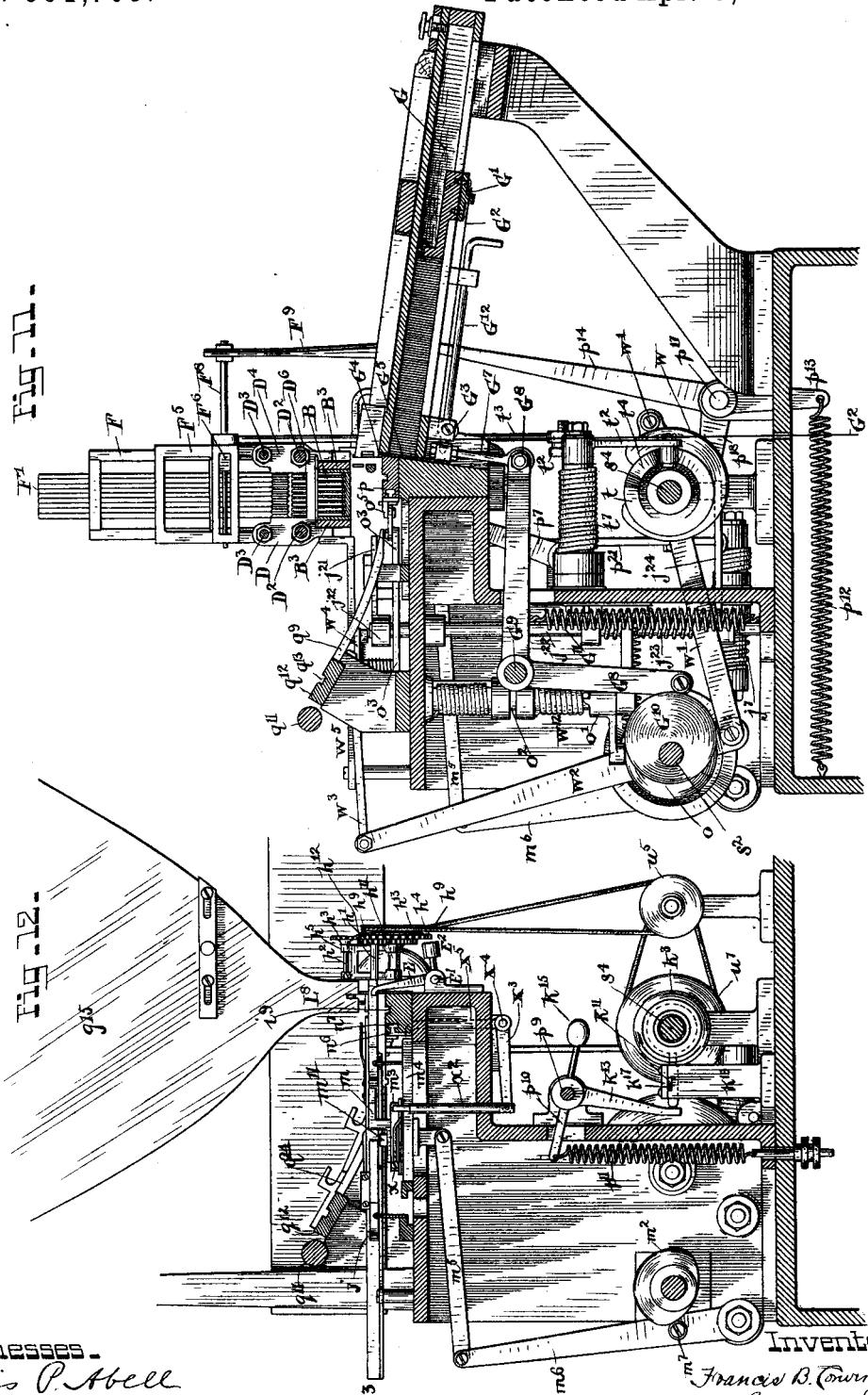

(No Model.) 12 Sheets—Sheet 10.
F. B. CONVERSE, Jr.
TYPE SETTING AND JUSTIFYING MACHINE.
No. 601,706. Patented Apr. 5, 1898.
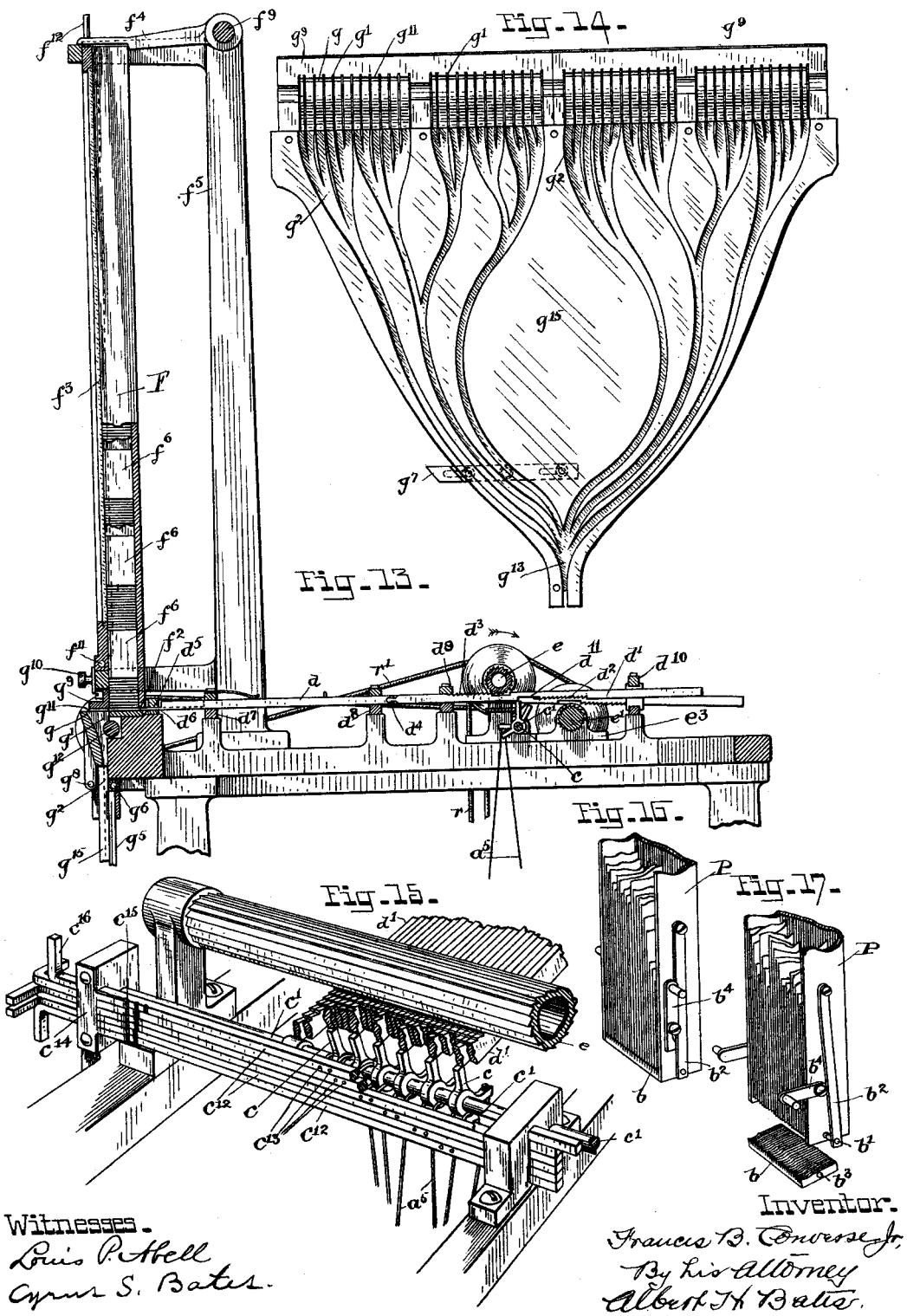
Witnesses.
Louis P. Abell
Cyrus S. Bates.
Inventor.
Francis B. Converse Jr.
By his Attorney
Albert H. Bates.
THE NORRIS PETERS CO., PHOTO-LITHO., WASHINGTON, D. C.

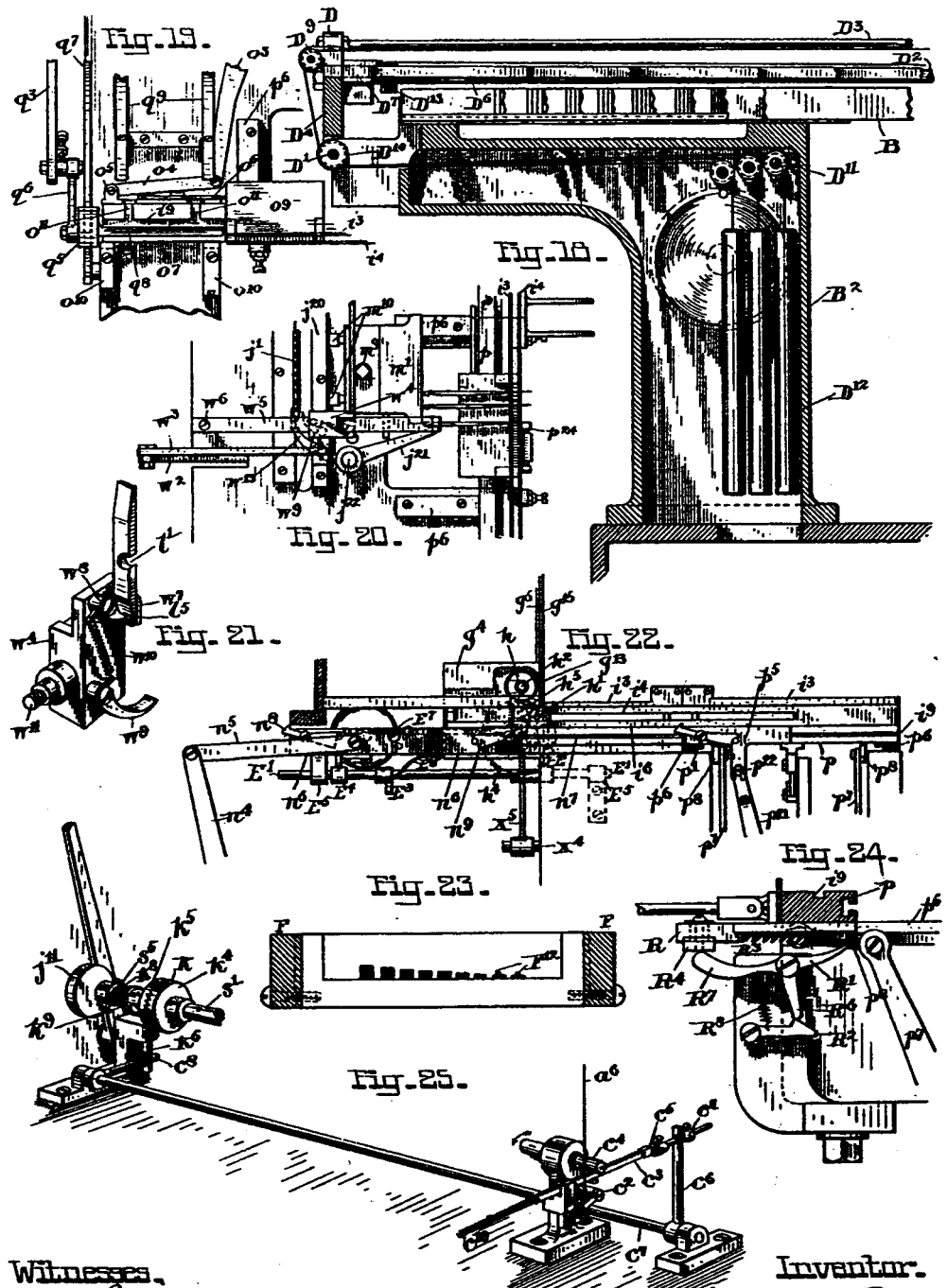

(No Model.)      F. B. CONVERSE, Jr.      12 Sheets—Sheet 12.
TYPE SETTING AND JUSTIFYING MACHINE.
No. 601,706.      Patented Apr. 5, 1898.
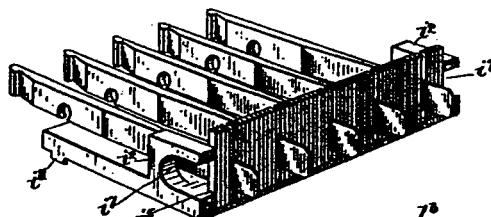
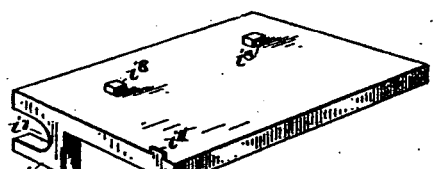
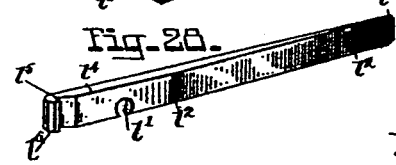
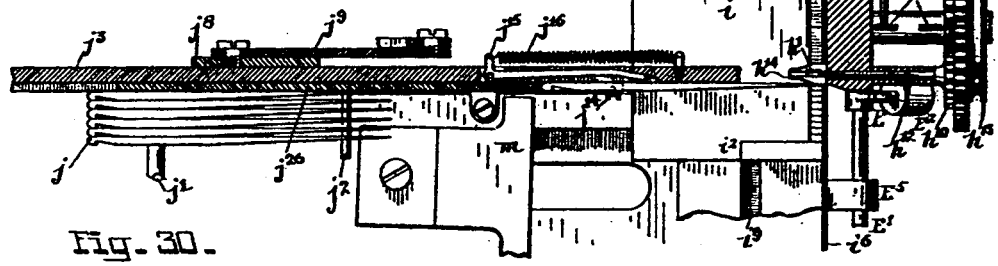
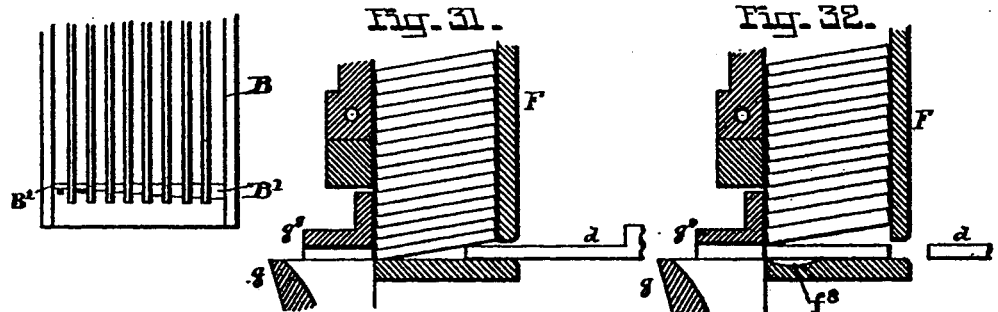
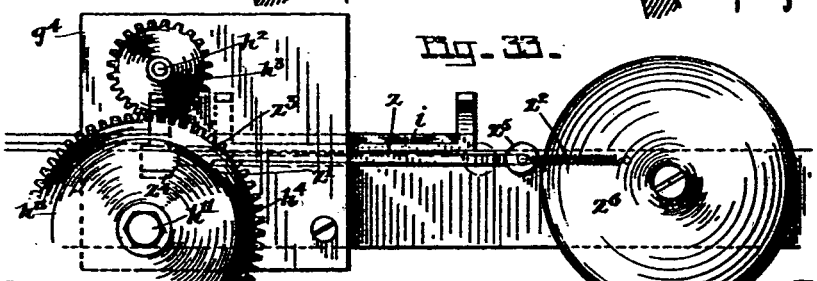
Witnesses.
Louis P. Abell
Cyrus S. Bates
Inventor.
Francis B. Converse Jr.
By his Attorney
Albert H. Bates.

UNITED STATES PATENT OFFICE.

FRANCIS B. CONVERSE, JR., OF LOUISVILLE, KENTUCKY

TYPE SETTING AND JUSTIFYING MACHINE.

SPECIFICATION forming part of Letters Patent No. 601,706, dated April 5, 1898.

Application filed December 28, 1894. Serial No. 533,215. (No model.)

*To all whom it may concern:*

Be it known that I, FRANCIS B. CONVERSE, Jr., a citizen of the United States, residing at Louisville, in the county of Jefferson and State of Kentucky, have invented certain new and useful Improvements in Type Setting and Justifying Machines, of which the following is a full, clear, and exact description, reference being had to the accompanying drawings.

My invention consists of a type setting and justifying machine which, by means of a keyboard and suitable operating mechanism, selects the desired characters from the magazine in which they are contained, places them in line, and inserts the proper-sized space-blanks between the words, so that successive lines of type shall be of the same length (within the allowable limits of variation) without dividing the words except between syllables and irrespective of the number of words or spaces in a given line.

There are many difficulties in the way of constructing a practical type setting and justifying machine. The arrangement of the setting mechanism must be such that the types will be formed in line in the exact order in which they are struck upon the keyboard no matter where the supplies of the different types are located and irrespective of the varying distance between them and the line, and this result must follow with the very highest speed of operation attainable by the skilled expert as well as with the slow speed of the beginner. The connection between the operating-keys and the supplies of types and the attendant mechanism must be such that an actuation of the key will cause the selection of its corresponding type and result in the placing of it in the line, and at the same time there must not be required for this actuation more force or time than is absolutely necessary. The different sizes of the types and the varying frequency of their use are also disturbing elements and require the adoption of special expedients to make a setting mechanism practically successful.

Peculiar difficulties are also met with in the construction of an automatic justifying mechanism. One of these arises from the fact that different lines do not contain the same number of words and spaces. One line of an ordinary newspaper may not have more than four spaces, while the succeeding and preceding lines may have five or six or seven or more, though the lines be of the same length. Another difficulty is that the size of the individual spaces and the aggregate of spaces in successive lines constantly vary, as does also the ratio between the individual spaces and the aggregate. This makes it impracticable to make any series of space-blanks of such size that the same line can always be filled out by the use of blanks of one size only. The machine must determine what different sizes of space-blanks are needed and how many of each size must be inserted, as well as accommodate itself to the varying intervals at which they are to be inserted, and then must select the proper space-blanks from their cases and insert them at irregular distances. Suppose, for illustration, that there are six spaces in a given line to be filled and the aggregate space occupied by them amounts to twenty-eight units. If the machine were to put in six space-blanks of four units each, it would fill up only twenty-four units of space, leaving four units unfilled. Were it to take space-blanks measuring five units each, the six space-blanks would take up thirty units and would make the line two units too long. The machine therefore must take two blanks of four units each and four blanks of five each, which together make the twenty-eight units of space. The next line may have forty-three units of space, yet contain only four spaces. To justify this line, it will be necessary for the machine to take one space-blank of ten units and three of eleven units each.

The object of this invention is to provide a machine in which the difficulties attendant upon setting mechanisms shall have been overcome and which will adapt itself to the ever-varying conditions of justification—a machine which will set types in line in the order in which the corresponding keys in the keyboard are actuated and which will determine what sizes of space-blanks are needed in each line and will select and insert the proper number and sizes accordingly, and thus automatically justify the lines evenly and accurately.

I will first give a general description of the best embodiment of my invention at present known to me, after which I will give a specific description with reference to the accompanying drawings, where said embodiment is shown.

The types with which the line is to be composed are placed on their flat sides in a series of cases (one or more cases for each character used in the machine) which stand vertically in a line across the machine. Each case has an opening in its rear near the base, which opening is of less height than the thickness of the type used in that case. Corresponding to each type-case is an ejector-bar controlled and set in operation by a key in a keyboard. When a key is actuated, its corresponding ejector-bar is caused by suitable mechanism to enter the corresponding type-case through the opening in the rear thereof and (the front of said case being so covered as to prevent the ejection of any but the lowest type) shove therefrom the lowest type, after which the ejector-bar and key return to their normal positions. When the types have been ejected from the front of the type-cases, they fall into converging chutes, where they are carried by gravity to a common point and shoved along by suitable mechanism, one after another, into a holder, the working length of which is equal to the length of the line desired and which for convenience I term a "line-holder." When one word has been assembled in the line-holder, an actuation of a key provided for that purpose, acting through suitable mechanism, causes a wedge to be placed in the line-holder with the thinner end in the line in the place of the ordinary space-blank. Although the term "space" is used in the printing art to designate the piece of material inserted between types to cause a space to appear between the printed letters, still, for convenience in this specification, I will always designate such a piece of material a "space-blank," reserving the word "space" to mean the void caused by the absence of material between successive types. Similarly, for clearness, I will use the word "types" for the plural of type instead of the more usual collective form "type." When the line-holder has been filled (as near as may be without dividing words except between syllables) with types and wedges, the actuation of a lever near the keyboard, which I term the "line-lever," setting into operation suitable mechanism, causes a movable bumper to be brought against the butt-ends of the wedges, driving them farther in between the types and taking up all the waste space caused by the line as set up being shorter than the type-including portion of the line-holder, which length is equal to the width of the column required. Mention hereinafter of the length of the line-holder is to be understood as referring to this type-including length. Succeeding this the line-holder is moved away from the bottom of the type-chutes and an empty line-holder brought into its place. The filled line-holder is then moved by suitable mechanism in the direction of the length of the line onto a movable platform, where it is caused to stop. Suitable mechanism now set in operation moves the platform and with it the line-holder in a direction transverse to the length of the line until it is stopped by the butt-ends of the wedges coming against a second and fixed bumper. The line-holder is then shifted in the direction of the length of the line until it is arrested by the first wedge coming against a stop. A magazine containing space-blanks varying in size progressively from the thinnest to the thickest is arranged across the machine above the platform and in such position with reference to the fixed stop that the space-blank, which is of exactly the same thickness as the space between the types occupied by the first wedge, (or if there is no space-blank of the same thickness then the next thinner,) will be directly above that part of the wedge which is between the types. Mechanisms now brought into operation drive the space-blank part way into the line above the wedge, (the wedges not being as high as the type,) then withdraw the wedge and string it upon a rod, afterward driving the space-blank home. The platform then again moves the line-holder transversely of its length, bringing the butt-ends of the wedges against the bumper, and thus driving them in to take up any waste space caused by the space-blank inserted being less in thickness than the section of the wedge between the types, after which the next wedge is replaced by a space-blank, as before. The same operation is gone through with until all the wedges have been replaced by suitable-sized space-blanks, the wedges being strung upon a rod from whence they are returned to their original position to be used again. The line-holder is then advanced farther along until it comes opposite the mouth of a galley. The line of type is shoved from the line-holder into the galley and the line-holder is returned toward its original position ready to be refilled with types and wedges as soon as the preceding line-holders (for several are used, their number varying according to the speed of operation) shall have been filled and moved away. All these operations since the first movement of the line-holder follow each other automatically, being controlled by mechanism set in operation by a single actuation of the line-lever.

The foregoing is a general description of this embodiment of my invention and is given for the purpose of clearness, but without the intention of limiting myself to the special devices mentioned therein or of excluding their equivalents. Equivalent agencies may be substituted for many of the subcombinations here described without departing in the least from the spirit of my invention. For instance, in place of a wedge form of spreading device, in which the thin portion is placed between the types and the device moved farther through the line to spread the same, any other form of device of proper dimensions capable of being placed between types and capable of being so moved as to spread the line might be employed and is within the scope of my invention. I will use the term "spreading device" in the claims as including such spreading agencies.

In general I do not wish to be understood as limiting myself to the construction described either in the foregoing description or to be set forth in the following detailed description further than is definitely pointed out in the claims.

I will now give a more specific description of the present embodiment of my invention with reference to the accompanying drawings, where the same is shown.

Figure 2:
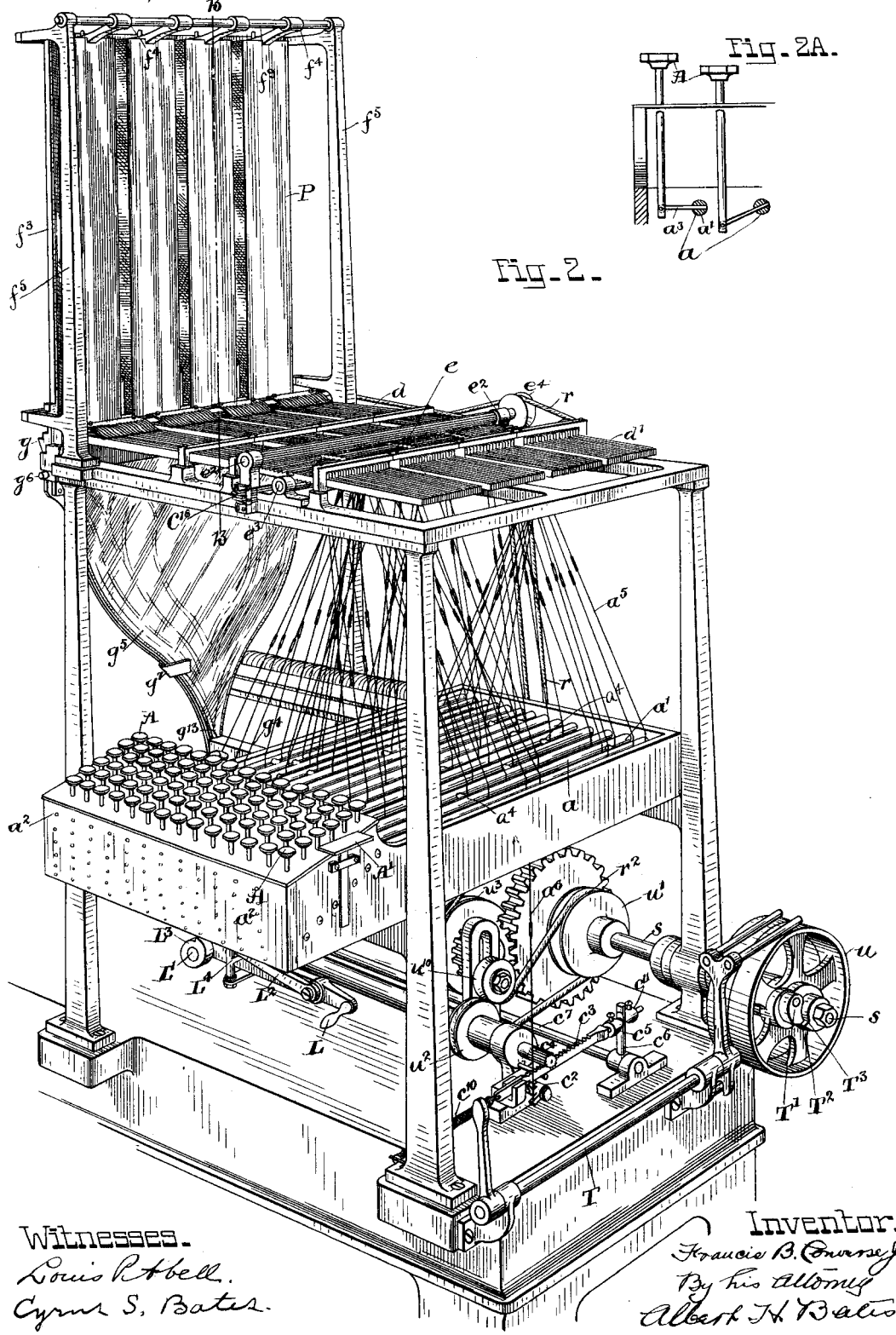
Figure 3:
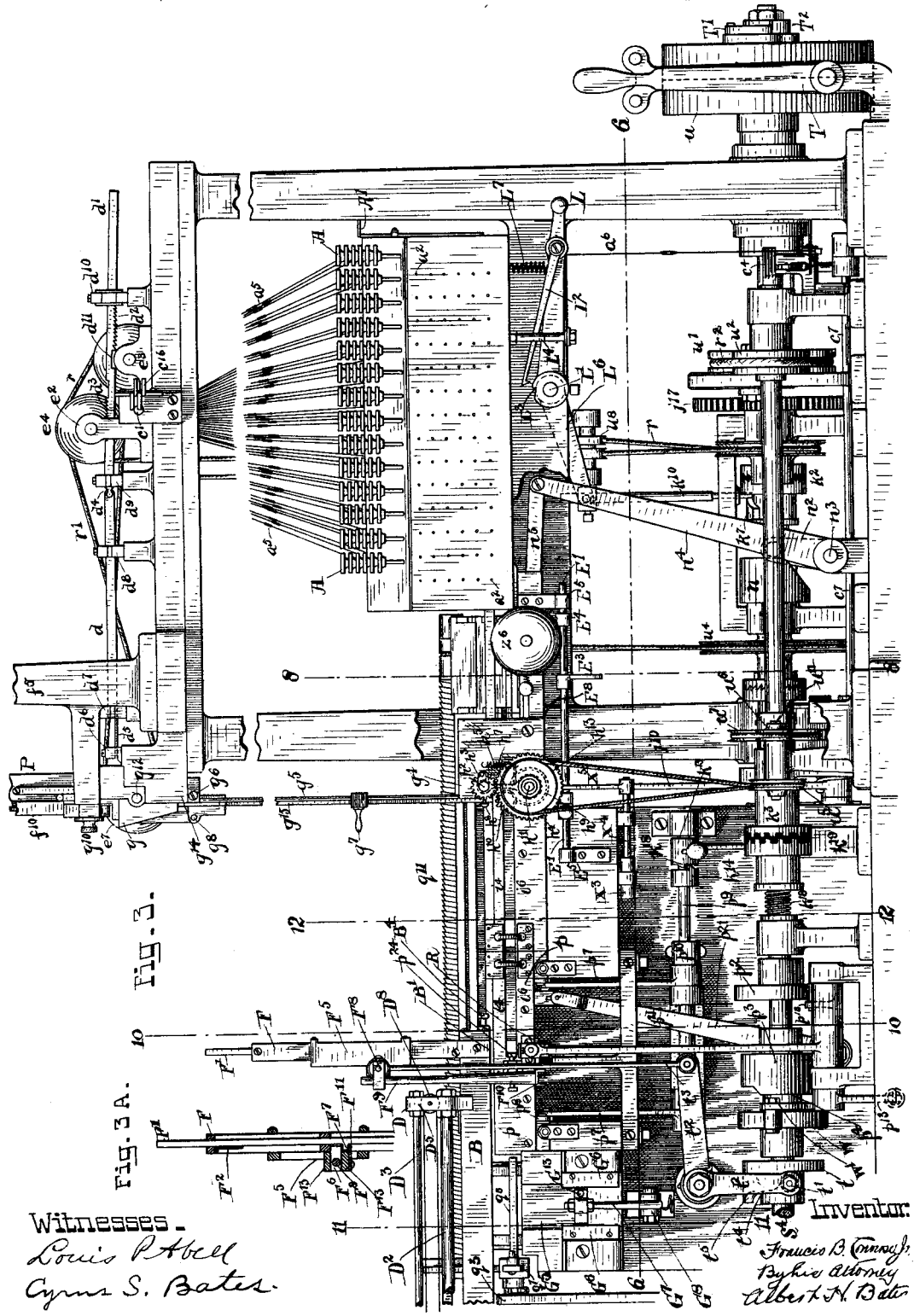
Figure 4:
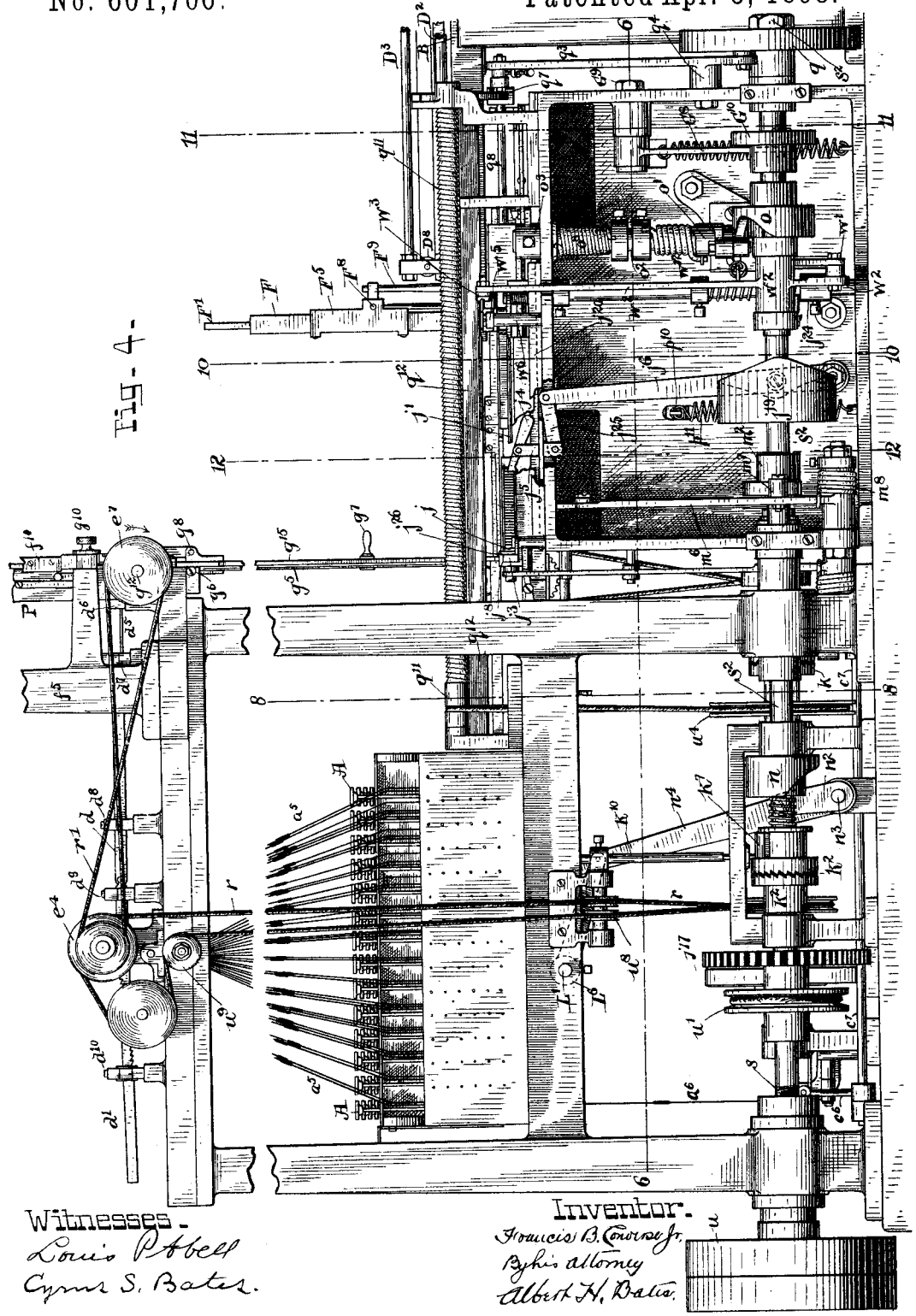
Figure 5:
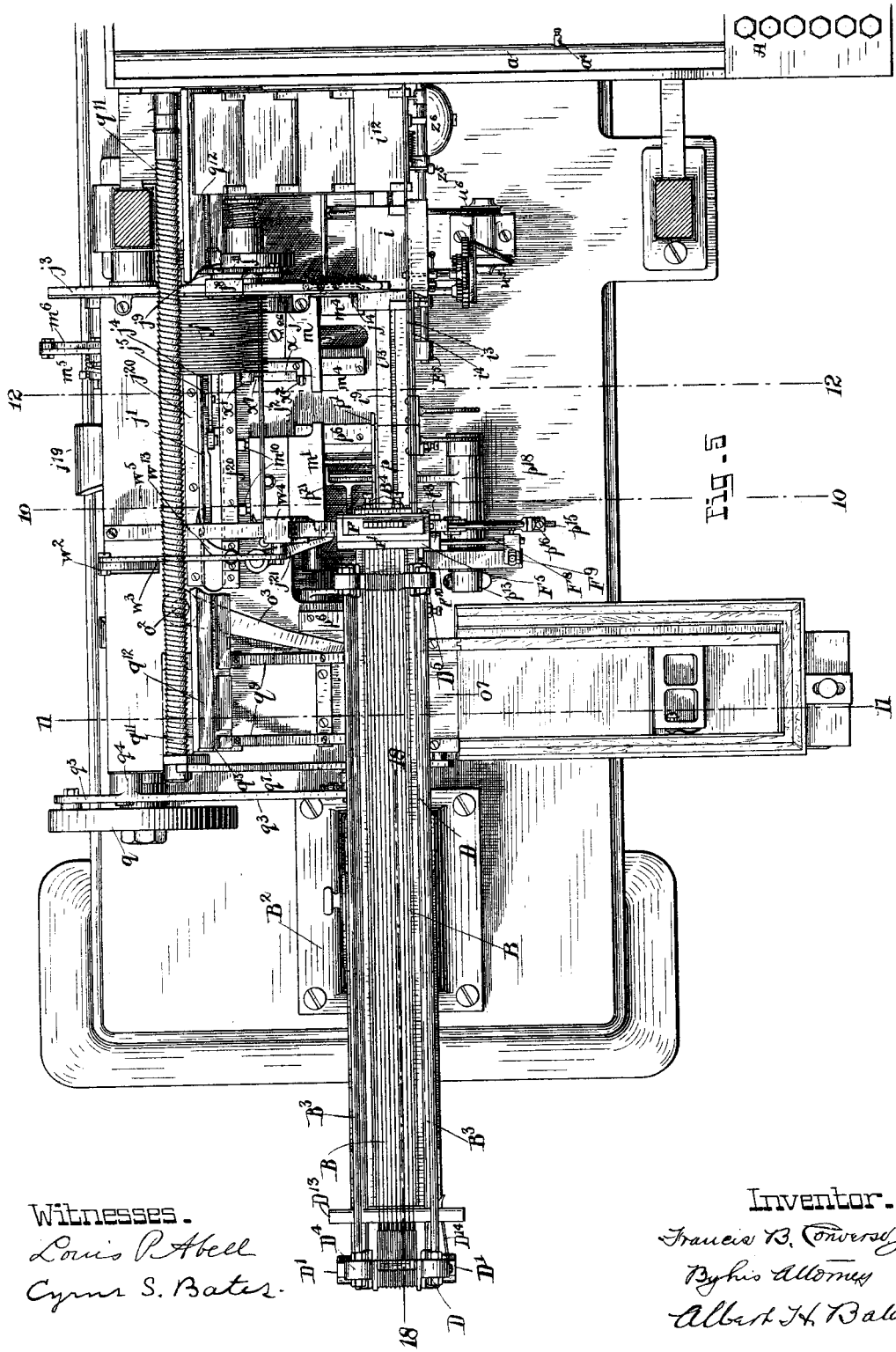

Figure 1 is a perspective view of my typesetting and justifying machine, taken from a position on the front or keyboard side at the left-hand end of the machine. Fig. 2 is a perspective view of the setting portion of the machine, taken from the right-hand end of Fig. 1, showing the disposition of the type-cases, ejectors, and keyboard; and Fig. 2$^A$, on the same sheet, is a detail showing the manner in which the finger-keys operate their rock-shafts. Fig. 3 is a front elevation of the machine, having the type-case portion and the portion at the extreme left of the machine—i. e., at the left hand of the operator as he faces the keyboard—cut away. Fig. 3$^A$ is a vertical section through the plunger-frame, taken on the line 3$^A$ 3$^A$ of Fig. 10. Fig. 4 is a rear elevation of that portion of the machine shown in front elevation in Fig. 3. Fig. 5 is a plan of the justifying portion of the machine. Fig. 6 is a sectional plan of the machine, taken on the line 6 6, Figs. 3 and 4. Fig. 7 is an end elevation taken from the right-hand end of the machine. Fig. 8 is a vertical section taken on line 8 8, Figs. 3, 4, and 6, looking from the right-hand end of the machine and showing the wedge-inserting mechanism. Fig. 9 is an end elevation from the left-hand end of the machine. Fig. 10 is a vertical section taken on line 10 10, Figs. 3, 4, and 5, looking from the right-hand end of machine. Fig. 11 is a vertical section taken on line 11 11, Figs. 3, 4, 5, and 6, looking from the left hand of machine. Fig. 12 is a vertical section taken on line 12 12, Figs. 3, 4, 5, and 6, looking from the left-hand end of the machine. Fig. 13 is a vertical section taken on line 13 13, Fig. 2. Fig. 14 is a view of the chute-plate and the hinged pieces attached to the top thereof seen from the same side as in Fig. 2. Fig. 15 is a perspective detail view of the mechanism for enabling one key to connect alternatively with the ejectors of more than a single type-case. Figs. 16 and 17 are detail views showing the methods of removing the ends of the type-cases. Fig. 18 is a vertical section through the space-magazine and support, taken on line 18 18, Fig. 5, showing the disposition of cords and weights. Fig. 19 is a detail view of the mechanism at the mouth of the galley for withdrawing the line of type from the line-holder and starting the line-holder on its return trip. Fig. 20 is a detail view in plan of the platform, the fixed bumper, and the wedge-withdrawing mechanism. Fig. 21 is a detail view of the wedge-withdrawing block. Fig. 22 is a detail view showing track and other parts at the point of assemblage of the type, looking from the back side of the machine. Fig. 23 is a horizontal section on line 23 23 of Fig. 10, showing a portion of the space-plunger frame, the right-hand end of Fig. 23 corresponding to the side of said frame nearest the front of the machine. Fig. 24 is a detail view of the mechanism for limiting the return movement of the platform, being a vertical section through its center. Fig. 25 is a perspective detail view of the mechanism for retarding the insertion of the wedges. Figs. 26 and 27 are perspective views of the line-holder, the first with types and wedges in place and the second showing the line-holder empty and inverted. Fig. 28 shows one of the spacing-wedges. Fig. 29 is a horizontal section taken on line 29 29, Fig. 8. Fig. 30 shows in plan the end of the removable space-magazine and orifices through which the space-blanks are ejected. Figs. 31 and 32 are detail views in section of the lower portion of a type-case, illustrating the use of a groove in the bottom of said case. Fig. 33 is a detail view of the bell-alarm to indicate the completion of a line.

The same reference-letters designate the same part in each figure, but for convenience, as there are many figures, I will usually indicate which figures best show any particular mechanism or part under discussion, and where attention has once been directed to a certain figure ordinarily the description following will refer to the same figure until others have been referred to.

The finger-keys A, Figs. 1 and 2, by which the type-setting operations are controlled, are mounted upon the top of vertical stems which pass through the frame of the keyboard and are loosely connected at their lower ends to one of the ends of the levers $a^3$, Fig. 2$^A$, the other ends of which are rigidly connected to the rock-shafts $a$, Figs. 2 and 5, which are journaled at $a'$ and $a^2$. Rigidly attached at some other point on each rock-shaft is the lever $a^4$. These latter levers are connected by means of the connecting-wires $a^5$ with the lifting-fingers $c$, Fig. 13, which are fulcrumed on the rod $c'$. The connecting-wires $a^5$ have turnbuckles, Figs. 1 and 2, about midway of their lengths, by which they may be properly adjusted.

A bar $d$, Fig. 13, which I call an "ejector," having a thinner front projection $d^5$ and a rear portion $d'$, adapted to swing vertically, which for convenience I call the "tail," is held by the guides $d^6$, $d^7$, $d^8$, $d^9$, and $d^{10}$ in such position that said tail is directly above the bell-crank finger $c$, there being as many of these bars as there are fingers $c$. The tail of the ejector-bar, which is connected to the front portion $d$ by means of the knuckle-joint $d^4$, is permitted a limited vertical oscillation about $d^4$ by the slots in the guides $d^9$ and $d^{10}$. Thus when a finger-key is depressed the corresponding finger-lever $c$ is actuated, and this raises the tail of the corresponding ejector-bar. Above the tails of the ejector-bars is placed the toothed shaft, or, as I for convenience call it, "gear-cylinder" $e$, Figs. 2, 13, and 15, journaled in bearings $e^2$ $e^2$, which engages with teeth $d^3$ upon the upper side of the ejector-bar tails when the same are raised by the fingers $c$. The gear-cylinder is continuously revolved in the direction indicated by the arrow by means of the belt $r$. When, therefore, the tail of any ejector-bar is lifted into connection with the gear-cylinder $e$, the ejector-bar is caused to move forward. A notch $d^{11}$ on the under side of the tail falls over the finger $c$ when the ejector-bar has moved forward a predetermined distance, and the tail drops out of connection with the gear-cylinder $e$ and into connection with the gear-cylinder $e'$, journaled in bearings $e^3$, Fig. 2, beneath the tail, there being teeth $d^2$, Fig. 13, on the under side of the tail for this engagement. This gear-cylinder $e'$ is revolved in the same direction as the gear-cylinder $e$ by means of the same belt $r$ and draws the ejector-bar rearward, carrying the finger $c$ and the finger-key A, Fig. 2, to their original positions. The ejector-bar continues to be drawn rearward until the notch $d^{11}$, Fig. 13, falls over the gear-cylinder $e'$ and the motion of the ejector-bar is arrested, leaving it in its original position. The teeth on the gear-cylinders and on the ejector-bar tails are made in the ratchet form shown, as I find that such construction gives the best results.

The types are contained in vertical type-cases, one or more case for each character used, which type-cases collectively extend across the machine. These cases are collected into banks of any convenient number, four such banks P, Figs. 1 and 2, of, say, twenty-three cases each, being a convenient disposition. These banks are made of any suitable material, having their sides, back, and bottom of sufficient thickness for rigidity and divided by thinner partitions, which are soldered or mortised into the back or otherwise secured in position. The lower ends of these cases are closed by the removable end pieces $b$, Figs. 16 and 17, which are grooved across their width to fit over the ends of the dividing-partitions. They are held in place by means of the pins $b'$, which are attached to the flat spring-pieces $b^2$, fastened to the outside of the cases, and which extend through the sides of the cases and into holes $b^3$ in the ends of the removable end pieces.

When a case has been removed from the machine and the upper ends of the levers $b^4$, pivoted by the side of the flat spring-pieces $b^2$, are pulled toward the end piece $b$, the lower ends, which are wedge-shaped, enter between the spring-pieces $b^2$ and the sides of the cases and cause the withdrawal of the pins $b'$. This permits the removal of the ends of the cases, which is done for the purpose of more conveniently filling the cases with type either by hand or by a distributing-machine. These banks of cases are held against the fronts $f^3$, Figs. 2 and 13, by hooks $f^4$, which swing on the rod $f^9$, supported by the standards $f^5$. The fronts $f^3$ I prefer to make of glass. A separate front for each bank is desirable and is the form shown, though one piece of glass could serve for all the banks. When the fronts are separate, they preferably consist of the plate of glass $f^7$, Fig. 1, supported in the frame $f^{10}$, which is hinged at $f^{11}$, (also Fig. 13.) When a bank of cases is removed from the machine, (which is done by tipping it backward and then lifting it out,) this hinge $f^{11}$ allows the glass front to swing back with it until the pin $f^{12}$, projecting from the top of the frame, comes into contact with the rod $f^9$. This is a sufficient distance to prevent any of the vertical lines of type in the cases from falling out forward.

Types are placed in the cases horizontally upon their sides, with their feet toward the back of the cases. An aperture $f^2$ is formed in each case opposite the foot of the lowest type. Through this aperture the forward end $d^5$ of the ejector-bar acts, as previously described, to eject the type, the edges of the aperture being slightly beveled, so that the ejector-bar may enter smoothly. The ejection of more than a single type is prevented by the piece $g^9$, covering the lower part of the case. A type having been ejected from its case, as the ejector is withdrawn the face end of the next type is permitted to fall first, resulting in a decided tendency of the types to hang in the position shown in Fig. 31, the face end resting on the bottom of the case and the foot end elevated, so that as the ejector again enters it will pass beneath the bottom type and lift the column of types instead of engaging and ejecting the bottom one. This effect, I have found by experiment, may be corrected by forming a groove in the front part of the bottom of the case, as shown at $f^8$, Fig. 32.

On the top of the line of types in each case is placed a metal slug or follower $f^6$, Fig. 13, which descends with the types. When the types from any case shall have become exhausted, the follower will have descended to the bottom of that case and, being higher than the opening through which the type is ejected, will stop the ejector-bar on its next movement. The gear-cylinder $e$, Fig. 7, is driven by means of the belt $r$, running over the pulley $e^4$. This pulley is loose on the cylinder-shaft and communicates its motion to the cylinder by means of friction between itself and the fiber collar $e^5$, fixed on said shaft. The pressure causing this friction is supplied and adjusted by the spring $e^6$ and the nuts $e^8$. This loose connection is provided so that when an ejector strikes one of the followers the pulley $e^4$ will slip on the shaft and thus permit the gear-cylinder to stop. The operator is thus immediately notified that the types from a case have become exhausted.

As the type is ejected from its case in the manner described its face end is received and supported by the ledge $g$, Figs. 13 and 14, and its foot is left free to fall to a nearly vertical position between the guides $g'$, from which position it slides foot foremost into the top of the chute $g^2$, the opening $g^{11}$, into which the face end of the type is received upon ejection, being just large enough to allow the type to fall toward its vertical position freely without permitting it to turn over from its flat side. The pieces forming the ledge $g$ are hinged at $g^8$, so that they may be opened outwardly for the purpose of cleaning, &c. The pieces $g^9$ are secured to the guides $g'$ and are held against the front of the type-cases by the buttons $g^{10}$ in such position as to permit only the lowest type to be ejected from any case, as previously stated. A roller $g^{12}$, continuously revolving in a left-hand direction, (indicated by the arrow in Fig. 4,) is placed in the path of the foot of the type to assist in the downward movement of the type and prevent it from hanging, as would be likely to be the case, especially with the lighter letters, if they were permitted to fall against a fixed surface. The roller $g^{12}$ receives its motion from the crossed belt $r'$, Fig. 4, which runs over the pulley $e^7$ on the rear end of said roller and over the periphery of the double pulley $e^4$, which is driven by the belt $r$.

The types fall from the ledges $g$ into converging chutes $g^3$ in the plate $g^{15}$, Figs. 1, 2, 13, and 14. These chutes are cut or otherwise formed in the plate $g^{15}$, which I term the "chute-plate," and they all converge into a common channel $g^{18}$ at the foot of said plate. These chutes are so curved that every type travels approximately the same distance and encounters substantially the same frictional resistance in falling from its point of ejectment to the common channel $g^{18}$, thus insuring that the type which is first ejected will first reach the said common channel. I have found it convenient to place the guides $g'$, Fig. 14, leading into the corresponding chutes, opposite every other partition between the type-cases, and this is the construction shown in the drawings, although this particular disposition is not essential. The chute-plate is fastened to the frame of the machine at $g^{14}$, Figs. 2 and 3, and near its lower end to the block $g^4$. The chutes are covered with a glass plate $g^5$, (also Fig. 13,) hinged at $g^6$ and held against the chute-plate by the hook $g^7$, Figs. 2, 3, and 14. The glass plate allows the operator to observe the descent of the types and may be swung open for the removal of types clogged in the channel, caused by striking two finger-keys at once, and for cleaning, &c.

Some characters—as, for instance, "e," "a," and "o"—are used much more frequently than others. It is therefore desirable to furnish two or more cases of such characters, in order that the operator may not have to stop so frequently to change the bank of cases. It is also desirable that types from either one of the cases containing the same character shall be ejected by the depression of the same key. This is accomplished in the following manner: The cases containing the same characters—as, for instance, three "e" cases—are placed adjacent to each other in the banks. One ejector-raising finger $c$, Fig. 15, is furnished for the three cases, the finger being free to move on the rod $c^2$, on which it is fulcrumed, from one ejector to another. The shifting rods $c^{12}$, having pins projecting therefrom, as shown at $c^{18}$, extend across the machine beneath the ejector-bars. The pins $c^{18}$ engage on opposite sides of the raising-fingers $c$, and thus a longitudinal movement of a shifting rod will cause its corresponding raising-finger to be moved under another ejector. The front ends of the shifting rods are bent at $c^{16}$, and each rod is marked, for distinguishment, by the letter to which it belongs. A furcated spring $c^{14}$ presses into notches $c^{15}$ in the rods $c^{12}$, holding them sufficiently firmly at the points intended. Thus when the stopping of the gear-cylinder indicates (as heretofore explained) that the types of some certain character are exhausted, if the character (indicated by the key remaining depressed) is one of those of which there are more than one case, the operator simply shifts the rod $c^{12}$ and proceeds.

At a point in the common channel $g^{18}$, Figs. 8 and 22, below the confluence of all the chutes is placed the wheel $h$, having a friction-surface of rubber or other material. This wheel is placed tangentially to the common channel, near the foot thereof, and is continuously revolved in a left-hand direction—i. e., toward the right in Fig. 22, which is looking from the back side of the machine. This wheel is carried on the shaft $h^2$, (also Figs. 3 and 12,) journaled in the upper end of the oscillating support $h^5$, which is pivotally supported on the stud $h^{11}$, screwed into the block $g^4$. On this stud is also the gear-wheel $h^4$, meshing with the gear $h^3$ on the shaft $h^2$. That end of the shaft $h^2$ which carries the wheel $h$ passes through a slot in the block $g$, long enough to permit the desired oscillation, the purpose of which will be hereinafter explained. The gear-wheel $h^3$, journaled as described, swings in its oscillation in a path concentric with the pitch-circle of the gear $h^4$, and thus the gears are always in mesh irrespective of the position of the gear $h^3$.

By means of a coiled spring $h^7$ the support $h^5$ is drawn toward the channel $g^{18}$ until its motion is stopped by the adjustable set-screw $h^8$, Fig. 3, in such position that the wheel $h$ just fails to touch the back of the channel $g^{18}$. Below the wheel $h$ and slightly in advance thereof is placed the wiper-wheel $h'$, Figs. 8, 12, 22, and 29, secured to the shaft $h^{12}$. On the end of the shaft $h^{12}$ is a gear-wheel $h^{13}$, meshing with a gear-wheel $h^9$ on the stud $h^{11}$. A belt running over the pulley $h^{13}$, Figs. 3, 8, 12, and 29, drives the gear-wheel $h^9$ and the gear-wheel $h^4$, already referred to, the pulley and the gear-wheels being rigidly secured together and all journaled on the stud $h^{11}$.

The wheels $h$ and $h'$ are by the means above described revolved in the same direction—i. e., downward on the side which comes in contact with the type. A type falling against the upper one is drawn in between it and the chute-plate, the spring $h^7$ permitting the wheel to retreat sufficiently to allow the type to pass. The retraction of this wheel is not dependent merely upon its action in drawing the type between it and the back of the channel. Were it so, making this wheel as small in diameter as is desirable, the thickest letters might not be drawn through. From the manner in which it receives its power as soon as the wheel is retarded by the falling of the type against it the revolution of the gear $h^4$ against the now-retarded gear $h^3$ has a tendency to carry the latter around with it, thus swinging the wheel $h$ backward until the type is permitted to pass between it and the back of the channel. After the type has passed the spring $h^7$ brings the support $h^5$ and the wheel $h$ back into position. The wheel $h$ thus receiving the types makes it impossible for them to turn over from their flat sides in the channel, which in order to accommodate the largest type must necessarily be of a greater dimension from front to back than would be allowable to invariably correctly guide the smallest type. The wheel $h$ guides the type down upon the wiper-wheel $h'$, Figs. 8, 22, and 29. This wiper-wheel consists of a hub from which project a plurality of arms, preferably four. These arms are ordinary wiper or tappet arms having their front edges curved to apply a gradual pressure to the body against which they bear and their rear edges radial. The wheel revolves rapidly, and as the radial edge of one arm receives the foot of a type and lowers it the curved edge of the following arm comes against the rear side of the type and advances it, and thus the type is delivered downward and forward to a point beyond the path of the type next succeeding. Before the upper end of the type is free from the wheel $h$ the lower end is held against the type next preceding (or against the end of the line-holder, to be hereinafter described, in case this is the first type in the line) by the wiper-wheel $h'$, thus preventing the possibility of the types swerving in any way as they are assembled in the line.

As the types are set up in the manner described they are assembled in the line-holder $i$, Figs. 5, 26, 27, and 29, which holds and carries the line of types and which is shoved forward by each type as it is inserted. This line-holder consists of a flat plate having a rabbet $i^5$ along its front upper edge, the width of which is equal to the width of the body of the type used. At each end of this plate are the flanges $i^2$, terminating the rabbet and limiting the length of the line carried. This line-holder may be made so as to be adjustable to different lengths of line desired; but I prefer to make it fixed, using, when necessary, rigid line-holders of different working lengths, though on bases of the same length. The flanges $i^2$ fit beneath the rail $i^3$, Figs. 5 and 22. The rails $i^3$ and $i^4$ (also Figs. 3 and 4) maintain the upper ends of the types in position, the feet of the types being in the groove formed by the rabbet $i^5$ and the rail $i^6$. These rails $i^3$ and $i^4$ and $i^6$ run from the foot of the delivery-channel through the part of the machine used in justifying and maintain the types in place. The recesses $i^7$ in the flanges of the line-holder are for the purpose of permitting it to pass the wiper-wheel as well as to allow the operation of the mechanism for delivering the line into the galley and starting the line-holder on its return trip, to be hereinafter explained. On the under side of the line-holder are the feet $i^8$, Fig. 27, designed to fit the grooves $i^9$, Figs. 5, 8, 10, 12, 19, 20, and 29, to guide it along its path. The projecting lip $i^{11}$, also on the under side of the line-holder and at the forward end thereof, is of use in returning the line-holder to its original position after the completion of a line, as will also be hereinafter explained.

A word having been assembled in the line-holder, as described, the space-key $A^4$, Figs. 2 and 7, is depressed. The ultimate result of this depression is the insertion into the line of a wedge which acts as a temporary spacing device. The immediate effect is the lowering of the front end of the lever $A^2$, fulcrumed at $A^3$, which, acting through the connecting-rod $a^6$ and the bell-crank $c^2$, raises the bar $c^3$ (having teeth cut in its upper edge similar to those in the ejector-bars $d$ already described) into engagement with the ratchet-teeth $c^4$ on the overhanging end of the continuously-revolving shaft $s^3$, Fig. 6. This mechanism is shown in detail in Fig. 25 and is for the purpose of retarding the insertion of the spacing-wedges, so that their entrance into the line may follow at the same interval after the depression of the space-key as does the entrance of a type after the depression of its key. In order that the operation of this mechanism may be better understood, the description thereof will be postponed until after the wedges and the mechanism for inserting the same shall have been described.

The spacing-wedges $j$, one of which is shown in Fig. 28, are preferably made of steel, with their width equal to about one-third the height of the type and their thickness varying from something less than the thinnest space-blank used in the machine to a little thicker than the thickest, the taper being determined by the series of space-blanks used. The working portion is included between the points $l^2 l^2$, beyond which there is an extension in each direction, at the small end an extension $l^3$ thinner than the thinnest spaceblank, and at the large end an extension $l^4$ thicker than the thickest. The extremity of the large end is beveled, as shown at $l^5$, and near said extremity on one side of the wedge is the notch $l^5$. Through the thicker extension and toward the bottom thereof is the eye $l'$, open at the bottom. The whole piece of metal, for convenience, I call a "wedge," although, as before stated, it has an inclined side for only a portion of its length.

I consider the form of wedge shown in the drawings and above described to be the most satisfactory, though the attendant parts might be easily so modified as to operate with various other forms, either simple or compound.

By means of the eye $l'$ the wedges are strung upon the rod $j'$, Figs. 4, 5, and 29, with their thin ends resting on the rod $j^2$. They are held against the guide-bar $j^3$ by the click $j^4$, carried in the block $j^5$, which is pressed toward the edges by the force of a spring $j^7$, Fig. 6, coiled around the hub of the lever $j^6$, to which lever the block $j^5$, Figs. 4 and 5, is connected by means of the link $j^{25}$.

Carried on the guide-bar $j^3$, Figs. 4, 5, 8, and 29, is the reciprocating block $j^8$, to which is rigidly attached, on the side of the guide next to the wedges, the bar $j^{26}$. This block and bar are moved along the guide in a rearward direction by the link $j^9$, Fig. 8, the lever $j^{10}$ and the cam $j^{11}$ acting on the roller $j^{12}$ on said lever. When the cam has imparted the maximum of rearward movement to the block and bar, the latter will be far enough back from the wedges to permit the first wedge under the action of the spring $j^7$, as already described, to be pressed forward into the path of said bar in front thereof. As the decreasing face of the cam $j^{11}$ passes the roller on the lever $j^{10}$ the block and bar are driven forward by the action of the spring $j^{18}$, Fig. 6, coiled around the hub of the said lever. As the bar advances it shoves the wedge, which is in front of it, forward and across the line-holder. The point of the wedge comes against the beveled portion $h^{14}$ of the wiper-wheel $h'$, Fig. 29, and is guided thereby behind the last type in the line. While the wedge is coming into position, it passes behind the end of the springwire $j^{14}$, (also Fig. 8,) which holds it against the guide $j^3$, yielding as the increasing portions of the wedge come behind it. When the reciprocating bar $j^{26}$ shall have reached its extreme forward position, the wedge will have been inserted the desired distance into the line. At the same time the wire $j^{14}$ springs into the eye $l'$, Fig. 28, of the wedge, preventing it from being carried farther by momentum. When the wedge is thus stopped in this forward movement, it stands with its thin straight portion in the line of type. This position is shown when the line is full of types in Fig. 26. The cam $j^{11}$, operating this wedge-inserting mechanism, is on the shaft $s^5$, Figs. 6, 7, 8, and 25, which may be connected by the clutch $k$ with the continuously-revolving shaft $s'$, which latter shaft receives its rotation from the main shaft $s$ of the machine by means of the gears $j^{17} j^{18}$, Fig. 6. The action of the clutch $k$ is as follows: Keyed on the continuously-revolving shaft $s'$ is the clutch member $k^4$. The other member $k^5$ is connected by a spline and groove with the shaft $s^5$, and is thereby capable of independent motion lengthwise of the shaft into and out of engagement with the driving member. It is held out of engagement by the pin $k^6$, bearing against the segment of a collar $k^9$ on the hub of the member $k^5$. This segment has its bearing-face inclined in the direction of its circular length and is similar to the segment $k^7$ on the clutch $k^2$ or the segment $k^{16}$ on the clutch $k^{12}$. When the pin $k^6$ is withdrawn from contact with the segment or bears against the lower portion of the face thereof, the coil-spring $k^8$, surrounding the shaft $s^5$, forces the driven member $k^5$ of the clutch into engagement with the driving member $k^4$. Thus upon the withdrawal of the pin rotation is immediately communicated to the shaft $s^5$ from the continuously-revolving shaft $s'$. If after the shaft $s^5$ has made part of a revolution the pin is returned to its position, (after the remainder of the segment has rotated past it,) it will toward the end of the revolution stand in the path of the inclined face of the segment and during the remainder of the revolution will be bearing against said face and forcing the driven member of the clutch away from the driving member, and just as the clutch has completed its revolution will completely disengage the two members. The driven member cannot be revolved by momentum beyond its original position on account of the segment, which at this point is continued up against the annular back of the member $k^5$, forming a wall against which the pin $k^6$ bears. Thus the shaft $s^5$ and with it the cam $j^{11}$ make exactly one complete revolution with each withdrawal and returning of the pin $k^6$, and the wedge-inserting mechanism operated by said cam is inactive except when the pin is withdrawn and a revolution permitted.

I will now return to the mechanism for communicating the motion of the space-key to the parts which operate upon the wedge-inserting lever which I have heretofore alluded to and which on account of one of its functions I will call the "wedge-retarding" mechanism. The bar $c^3$, Figs. 6, 7, and 25, being brought into engagement with the revolving toothed shaft $c^4$ by the depression of the space-key A', as described, the said bar $c^3$ is driven backward until the adjustable collar $c^5$ strikes the lever $c^6$ and pushes it backward. This, by means of the rock-shaft $c^7$ and the lever $c^8$, withdraws the pin $k^6$ from the clutch $k$ and permits the members to engage and the shaft $s^5$ and the cam $j^{11}$ to revolve and thus insert a wedge. The bar $c^3$, falling out of engagement with the toothed shaft $c^4$ by the notch $c^9$ coming over the end of the raising-finger of the bell-crank $c^2$, (as in the case of the ejectors heretofore described,) is returned by the tension of the spring $c^{10}$. The collar $c^{11}$, adjustably secured on the bar $c^3$ near the rear end thereof, thus comes against the lever $c^6$ and causes the pin $k^6$ to be raised into position to open the clutch at the end of the revolution.

The occasion arises for the use of the above-described connection between the space-key and the clutch $k$, instead of direct-acting levers, from the following consideration: An appreciable interval of time follows after the depression of a key in the keyboard before the type reaches its position in the line-holder—say, in round numbers, one second. The wedge must follow at the same interval behind the depression of the space-key in order that it shall not be inserted in the line before the type that should precede it. This could be accomplished by giving the shaft carrying the cam $j^{11}$ a sufficiently slow rate of revolution, (once a second;) but in this case the space-key could be effectively depressed only at intervals of a second. This is more time than is required for the setting of words of only one or two letters, and hence after setting such a word there would have to be a sufficient delay before actuating the space-key to allow the clutch to finish its revolution, or if the space-key were earlier depressed it would have to be held until the completion of the revolution. This delay would of course be undesirable. To avoid it, the collars $c^5$ and $c^{11}$ are so set that a half of the supposed second is consumed in driving the collar $c^5$ against the lever $c^6$ to withdraw the pin $k^6$, and by causing the clutch $k$ to make a complete revolution in a half-second the second will be consumed between the depression of the space-key and the delivery of the wedge. The bar $c^3$ returning immediately after its operation under the retraction of the spring $c^{10}$, the space-key may again be depressed before the end of the revolution of the clutch $k$, the travel of the bar $c^3$ consuming the time until the revolution is completed. Thus the space-key can be depressed at intervals of half a second, delivering each wedge into the line after the lapse of a second from the time of the depression.

The operations thus described are repeated for each space in the line, the insertion of each wedge of course shoving the line-holder forward a distance equal to the thickness of the wedge at the line-crossing section. It is desirable that there should be means of notifying the operator when the line is nearly completed, so that he may be able to make it end at the end of a word or syllable without the necessity of watching the line-holder. To do this, I provide mechanism as follows: As the line-holder is being brought along the track $i^{13}$, Fig. 5, from its position of rest at $i^{12}$ toward its working position at $i$, as will be hereafter described, the forward end of the line-holder comes into contact with the beveled shoulder $z^3$ on the piece $z$, Figs. 29 and 33, and shoves the piece along with it against the tension of the spring $z^2$ until the projection $z'$ on the bottom of the forward end of the said piece comes over the cavity $z^4$. The line-holder continuing in its forward movement forces the projection $z'$ into the cavity $z^4$ and rides over the shoulder $z^3$, holding the piece $z$ in this forward position until, when the line-holder has been nearly filled with types and wedges, the rear end passes off from the forward end of said piece, permitting it to be retracted by the spring $z^2$. The retraction causes the hammer $z^5$ to strike and ring the bell $z^6$, thus notifying the operator that the line is nearly completed.

When as many words or syllables as the line will carry without crowding have been assembled with wedges inserted between the words, the lever L, Figs. 1, 2, 3, and 7, which I term the "line-lever," is depressed. (It is shown as depressed in each figure, though it will only be in this position when the operator's hand is on it.) This lever is free to turn on the rock-shaft L', but when raised the hook L$^2$ engages the notch in the collar L$^3$, which is fixedly attached to the rock-shaft. As the lever is depressed this rock-shaft L' is turned until the hook striking the bar L$^4$ releases the collar, when the shaft is revolved back to its original position by the spring L$^5$. On the other end of this shaft L' is the lever L$^6$, Figs. 3 and 4, operating the pin $k^{10}$, which serves to maintain the members of the clutch $k^2$ out of engagement. The action of this clutch is similar to that of the clutch $k$, heretofore explained, so that the description thereof need not be here repeated. The above-described connection between the line-lever L and the rock-shaft L' is provided so that the pin $k^{10}$ will be returned to position as soon as the clutch has rotated the proper distance therefor even though the operator should hold down the line-lever. When the operator removes his hand from the line-lever, the spring L$^7$ returns the same to position and the hook L$^2$ drops into the notch L$^3$, ready for another depression.

When the depression of the line-lever L causes the withdrawal of the pin $k^{10}$ from the clutch $k^2$, the two members of the clutch engage and communicate to the shaft $s^2$, Figs. 4 and 6, one complete revolution from the continuously-revolving shaft $s$. Upon the shaft $s^2$ are the cams $n$, $m^2$, $j^{19}$, G$^{10}$, $o$, and $q$, the operation of which will be described in the order in which they are concerned.

The first operations upon the assembled line of type are produced by the cams $m^2$ and $n$, which perform their functions in successive half-revolutions of the shaft $s^2$, the cam $m^2$ in the first half and the cam $n$ in the second. Considering first the cam $m^2$, this cam bears against the roller $m^7$, Figs. 4, 5, 6, and 12, on the lever $m^6$, which is connected by the link $m^5$ to the reciprocating block $m^3$. A spring $m^8$, coiled about the hub of the lever $m^6$, presses the lever in the direction of the cam and causes the roller $m^7$ to constantly bear upon the face thereof. Adjustably secured to the block $m^3$ by means of the screw $m^{11}$ is the piece $m$, which, on account of its function to be immediately described, I call the "movable" bumper. This bumper stands opposite the large ends of the wedges in the assembled line. As the cam $m^2$ revolves, the decreasing face thereof bearing against the roller $m^7$, the bumper is advanced by the spring $m^8$ against the ends of the wedges, driving them through the line of types, causing the line to be expanded to the limits of the line-holder. The increasing face of the cam bearing against the roll causes the withdrawal of the bumper. This has taken one-half of the revolution of the shaft.

There must, of course, be room enough between the edge of the bumper and the guide $j^3$, Fig. 5, to allow for the convenient insertion of the wedges into the line. Owing to this space, unless some precaution was taken, the bumper might miss a wedge which happened to be placed very near the last end of the line—say with only the letter "a" following it. To obviate this difficulty, I provide in a recess in the guide $j^3$, (also Fig. 29,) the small lever $j^{15}$, against which the wedge passes in its travel to the line-holder. The wedge being between the guide $j^3$ and the spring-wire $j^{14}$ presses the lever backward onto its seat until the eye in the wedge comes opposite said spring-wire. At this point the wire springs into the eye, the travel of the wedge stops, as heretofore explained, and the lever $j^{15}$, under the tension of the spring $j^{16}$, shoves the large end of the wedge far enough sidewise so that the bumper in its forward movement will in any event engage it.

At the beginning of the second half of the revolution of the shaft $s^2$ the decreasing face of the cam $n$, Figs. 4 and 6, meets the roll $n'$ on the lever $n^2$. This lever is on the rock-shaft $n^3$, on the other end of which is the lever $n^4$, connected by means of the link $n^5$, Fig. 22, with the reciprocating bar $n^6$. This bar, which would be seen in Fig. 5 if the two forward line-holders $i$ and $i^{12}$ were removed, is supported on the side of the track $i^{13}$ by a T-tongue sliding in the T-groove $n^7$, Figs. 12 and 22. On this reciprocating bar $n^6$ are the trips $n^8$ and $n^9$, of which $n^9$ stands just behind the line-holder when filled and $n^8$ behind the following line-holder, (shown at $i^{12}$ in Fig. 5.) Around the rock-shaft $n^3$, Fig. 6, is coiled a spring $n^{10}$. This spring by means of the lever and link moves the bar toward the left of the machine—i. e., toward the right in Fig. 22—while the decreasing face of the cam $n$, Figs. 4 and 6, is passing the roll $n'$. In this forward motion of the bar $n^6$ the trip $n^9$, Fig. 22, engages the filled line-holder and advances it along the track $i^{13}$ (also Fig. 5) to a position on the movable platform $p$ in advance of the trip $p'$. At the same time the trip $n^8$ on the bar $n^6$ engages the next following line-holder (shown in Fig. 5 at $i^{12}$) and advances it to a position at the point of assemblage ready to receive the types and wedges of a new line.

The ends of the line-holder being recessed, as heretofore described, the first type coming into the line would tend to have its foot shoved into the recess in the forward end and to lean in a slanting position against the wiper-wheel instead of being set up with its foot in the groove formed by the rabbet and rail. To prevent this, I provide mechanism described below, which has not been earlier explained because its operation could not be so well understood.

E, Figs. 12 and 22, is a detent-lever secured to the rock-shaft E' and provided with a bell-crank arm having a weight $E^2$ attached thereon. The end of this detent-lever E stands just in front of the wiper-wheel and closes the recess in the forward end of the line-holder in such position that the first type in the line comes against it. Secured to the rock-shaft E', Figs. 3 and 22, are also the arms $E^3$ and $E^4$, the latter of which is very short. This rock-shaft is carried in the bearings $E^5$ and $E^6$ and is free to move lengthwise as well as turn through a portion of a revolution. As the types come in behind the detent-lever it and the connected parts described are advanced. The weight $E^2$ tends to cause the detent-lever to swing out of the path of the line of type; but this is prevented by the arm $E^4$, which bears against the under side of a block $E^6$. When the arm $E^4$ has traversed the length of the block and slides off of it, the detent-lever is swung by the weight out of the path of the line and the end of the arm $E^3$ swings up beneath the bar $n^6$. In this position all the parts stand until the line-lever is depressed at the conclusion of the line. As the bar $n^6$ advances to carry the filled line-holder to the platform, as already described, the trip $E^7$ on said bar trips over the end of the arm $E^3$ and as the bar returns brings the arm $E^3$ back with it, and the end of the arm $E^4$, which was swung up even with the front edge of the block $E^6$ when the detent-lever was tipped from its detaining position, returns along the front edge of said block. As the arm $E^3$ is thus carried back it encounters the spring $E^8$, which tends to swing the parts back into their initial positions, but is prevented by the end of the arm $E^4$ bearing against the block. As the arm $E^4$ slides off of the end of the block, as it does when the detent-lever comes opposite the position in which it is intended to stand in the end of the line-holder, the spring $E^8$, pressing down on the arm $E^3$, depresses it and swings said detent-lever into position, maintaining it thus until types enough (one or two) have come behind it to advance it sufficiently to bring the arm $E^4$ under the block $E^6$. After the first type is in the line-holder the function of the detent-lever is finished; but it travels far enough (the length of the block $E^6$) to permit the arm $E^3$ to swing up clear of the spring $E^8$ as said detent-lever swings out of the path of the line of type, the arm $E^3$ only encountering this spring again as it is being returned after the arm $E^4$ is against the front edge of the block $E^6$. When the detent-lever tips from the line, it swings through a sufficient arc to be out of the way of the wedges as they are driven into the line by the movable bumper.

In order that the mechanism described for advancing the line-holder may not operate if it should contain either too few or many types for proper justification, I provide the following governing device: Carried on the block $m^3$, which supports the movable bumper $m$, Figs. 5 and 12, is the raising-bar $x$, pivoted on the horizontal stud $x'$. The front end of this bar is at an angle, as shown, and it projects laterally from the block $m^3$ a sufficient distance to take into a notch on the inner side of the upper end of the rod $x^2$. The rod $x^2$ is connected by the lever $x^3$, Figs. 3, 8, 12, and 22, and the shaft $x^4$ with the detent $x^5$, which stands just in front of the forward end of the reciprocating bar $n^6$ (which, as heretofore described, carries the trips $n^8$ and $n^9$ to advance the line-holders) and locks said bar against forward movement. When the bumper $m$, Figs. 5 and 12, is advanced against the ends of the wedges and drives them farther through the line, as described, the raising-bar engages with the notch in the rod $x^2$. The inclined end of the bar advancing raises the rod $x^2$, which tips the detent forward and out of the path of the bar $n^6$, thus permitting the latter to advance the line-holder, when the decreasing face of the cam $n$ permits the spring $n^{10}$ to act. This is the action of the raising-bar $x$ when the line contains a proper amount of type for justification; but suppose there are too many types in the line-holder, so that the wedges cannot spread them sufficiently to permit the entrance of the smallest size of space-blanks, the raising-bar $x$ is so adjusted with reference to the bumper $m$ that in this case as the bumper is stopped by the wedges the inclined end of the said bar $x$ will not have raised the rod $x^2$ sufficiently to throw the end of the detent $x^5$ out of the path of the bar $n^6$, and the spring $n^{10}$ will not be able to drive the bar forward when the cam $n$ permits. On the other hand, if there are too few types in the line, so that the largest space-blanks will not be able to fill it, the bumper $m$ will pass forward so far that the notch $x^7$ in the raising-bar $x$ comes under the end of the rod $x^2$. This permits said rod to fall by its own weight, returning the detent into the path of the bar $n^6$ and locking it. As the bumper returns to its original position the raising-bar $x$ passes over the end of the rod $x^2$ and drops into its normal position, as shown. Thus whenever there are either too many or too few types in the line to permit proper justification the advancing mechanism is locked, and the line-holder will not be advanced until the irregularity shall have been corrected. The occasion for the use of this governing mechanism will seldom arise with the skilled operator, but it is provided so that in no event may a line that is either too short or too long to be properly justified be started into the justifying mechanism.

As the lever $n^4$, Fig. 6, advances under the action of the spring $n^{10}$ (the detent $x^5$ being tipped away from the front of the bar $n^6$, as above described) the lug $n^{11}$, attached thereto, strikes the collar $n^{12}$ in the rod $n^{14}$, forcing it forward. The forward end of this rod is formed in the shape of a flat wedge and passes through a hole in the block $k^{19}$ and through a notch in the upper side of the pin $k^{11}$, slidably supported by said block. The hole is shown at $k^{17}$ in Fig. 12, and a portion of the notch is visible through it. The result of thus forcing the wedged end into the notch in the pin $k^{11}$ is to throw the latter from the driven clutch member $K^{12}$, permitting it to engage with the driving member under the action of the spring $k^{18}$ and establishing a community of rotation between the shaft $s^3$ and the shaft $s^4$.

Upon the shaft $s^4$, rotated as above described, are the cams $p^2$, $p^3$, $p^4$, $w$, and $t$, of which $p^3$ and $p^4$ are made in one piece. The first of these cams to be considered is $p^2$, which operates the movable platform $p$, upon which the line-holder with its contained types and wedges has been left by the advancing movement of the bar $n^6$. The explanation of the operation of this and the other cams will be postponed until after the platform itself has been described.

The platform $p$, Figs. 1, 3, 5, 10, 11, 20, 22, and 24, is something more than twice the length of the line-holder and has continued across its length the rails $i^3$, $i^4$, and $i^6$ and the groove $i^9$ already referred to, and along its rear edge is the T-groove $n^7$, in which the piece $p^5$, carrying the trip $p'$, slides. The platform has a backward and a forward motion on the guides $p^6$ $p^6$ and is controlled by the levers $p^7$, connected therewith by the links $p^8$. These levers are rigidly attached to the shaft $p^9$, Figs. 3, 6, and 12. To this shaft is also rigidly secured the lever $p^{10}$, which extends rearward, and to the end of which the spring $p^{11}$ is attached. This spring tends to draw the platform backward; but it is overcome by the tension of a stronger spring $p^{12}$, Figs. 10 and 11, acting through the lever $p^{13}$ and $p^{14}$ and the rod $p^{15}$, which rod is secured to the platform and passes loosely through an elongated hole in the said lever and has near its end the collar $p^{16}$, against which the said lever bears. On the shaft $p^{17}$, to which the lever $p^{14}$ and $p^{13}$ are attached, is the lever $p^{18}$, Figs. 3, 5, 6, and 11, carrying the roll $p^{19}$, which bears against the cam $p^2$.

The first effective operation produced by the revolution of the shaft $s^4$, above referred to, is by the cam $p^2$, the other cams on the shaft operating idly meanwhile. The increasing face of this cam $p^2$, acting upon the lever $p^{13}$, moves the lever $p^{14}$ backward against the tension of the spring $p^{12}$ and permits the platform $p$ to be pulled backward on the guides $p^5$ $p^6$ by the retraction of the coil-spring $p^{11}$, acting through the lever $p^{10}$, the shaft $p^9$, and the levers $p^7$, and the links $p^8$. This rearward movement of the platform brings the butt-ends of the wedges in the composed line in the line-holder against the fixed bumper $m'$, Figs. 5 and 20. This bumper is adjustably supported, being held by the screw $m^2$, passing through a slotted hole, and the set-screws $m^{10}$ and $m^{19}$, abutting against the stationary bar $j^{20}$. This bringing of the wedges against the bumper drives them into the line with a force determined by the strength of the spring $p^{11}$. When they have reached a point where any further driving in would require a force greater than that of the said spring, the platform stops. The lever $p^{14}$ slides loosely along the rod $p^{15}$, and is thus permitted to make its full swing under the action of the cam $p^2$ independently of the point at which the platform may be stopped. The greatest radius of the cam $p^2$ having passed the roller on the lever $p^{18}$ the tension of the spring $p^{12}$, being greater than that of the spring $p^{11}$, tends to cause the platform to return to its initial position. This return movement is impeded by a tooth of the rack R, Figs. 10 and 24, attached to the under side of the platform, becoming engaged with the pawl R'. The purpose of the operation will be described shortly.

Above the platform $p$ is the magazine of space-blanks B, Figs. 1, 3, 4, 5, 10, 11, and 30. This consists of a series of cases of a width to receive the space-blanks used arranged parallel with each other and having orifices, as at B', at a point above about the middle of the platform. These orifices are arranged, as shown, in a straight line at right angles to the line of type in the line-holder, and the first space-blank in each case is fed up to a point directly over the orifice by means to be hereinafter described. The space-blank cases are equal distances apart, the case nearest the front of the machine containing the thinnest space-blanks, the next case to it containing the next thicker, and so on across, the thickest space-blanks being contained in the most rearward case.

The rack R, Fig. 24, above referred to, is attached to the platform midway of its length and upon its under side. The teeth $R^3$ of this rack are the same distance apart as the space-orifices in the space-magazine. The pawl R', having the projecting arm $R^6$, working either side of the wedge-faced click $R^2$, engages with the teeth in this rack. After the rearward movement of the platform carrying the line-holder is stopped by the wedges coming against the bumper the platform tends to return to its initial position, but will do so only for a distance shorter than the distance between two consecutive teeth of the rack R, when it will be arrested. The rack is so placed that the platform will be stopped at a point such that as the line-holder is advanced in the direction of its length the line of types will pass vertically beneath the case in the magazine containing space-blanks of the same thickness as the line-space occupied by the said wedges, or if no space-blank is of the same thickness then the next thinner.

Following the action of the cam $p^2$, above described, the decreasing face of the crown-cam $p^3$ passes the roll $p^{20}$ on the lever $p^{21}$, Figs. 3, 5, 6, 10, and 22. The upper end of this lever is made in the spade-handle form shown, the rod $p^{22}$ passing through a slot in the foot of the downwardly-projecting leg of the block $p^5$, which is slidably supported at the back of the platform by a T-tongue which bears in a T-groove in the rear edge of said platform. Thus the rod $p^{22}$ imparts its motion to the sliding block, and at the same time its length allows the platform to make its full backward and forward movement, the leg of the block $p^5$ sliding on the said rod $p^{22}$. Pivoted at $p'$, Fig. 22, is a trip which trips up behind the line-holder, engaging with it when the block $p^5$ advances. As the decreasing face of the cam $p^3$ passes the roll on the lever $p^{21}$ the line-holder is advanced along the platform by means of the trip $p'$, the block $p^5$, and the said lever $p^{21}$ under the tension of the spring $p^{23}$, Fig. 10, coiled around the hub of the lever, until arrested by the first wedge in the line-holder being stopped by its ends coming against the stop $p^{24}$, Figs. 3, 10, and 20, and the end of the lever $j^{21}$, Figs. 5 and 20. These points are so adjusted as to stop the wedge in a position vertically beneath the line of orifices of the space-magazine. Any remainder of the decreasing face of the cam $p^2$ moves idly by, and when the increasing face bears upon the roller 20 on the lever $p^{21}$ the block $p^5$ is returned and the line-holder left standing in the above-described position.

Attached to the frame in which the space-magazine is carried is the framework F, Figs. 1, 3, 3^A, 4, 9, 10, and 11, carrying plungers F', each of these plungers being in a position directly above the first space-blank in the case beneath it, in such manner that a depression of the plunger will eject the space-blank through its orifice. Springs $F^2$ (best shown in Fig. 3^A) make sufficient friction against the plungers to hold them in a raised position. These plungers, uniform in thickness throughout their upper portions, are reduced at their lower portions to the thickness of their corresponding space-blanks, so that they may pass through the orifices B', Fig. 30. In order that the reduced portion of those plungers which act upon the smallest space-blanks may be sufficiently rigid, they are provided with ribs $F^{12}$, Figs. 10 and 23, the corresponding orifices being notched to allow the passage of the same. The frame F, containing these plungers, carries also the open cross-head $F^5$, Figs. 1, 3, 3^A, 5, 9, 10, and 11. On the back side of the cross-head are the cross-bars $F^{13}$, forming a slot between them in which works a block $F^6$. This block projects a sufficient distance to engage with a lug $F^7$ on a plunger, there being one such lug on each plunger, and the block $F^6$ being only wide enough to engage one lug at a time. The block $F^6$ is attached to the rod $F^8$, which passes through bearings in the cross-head $F^5$ and is connected by a vertically-slidable connection with the standard $F^9$, which is rigidly secured to the platform by means of the bar $F^{10}$, Figs. 3, 5, and 10, screwed to the under side thereof. Thus the block $F^6$ partakes of the transverse movement of the line-holder on the platform, but may travel up and down independently thereof, and it is so adjusted that it engages with the lug projecting from the plunger corresponding to that space-case which is directly above the line in the line-holder.

At the beginning of the second revolution of the shaft $s^4$ the increasing face of the crown-cam $t$ meets the roller $t'$ on the bell-crank lever $t^2$, Figs. 1, 3, 6, 10, and 11, causing it to pull the cross-head $F^5$ downward by means of the connecting-rod $t^3$. This depression of the cross-head causes the block $F^6$ to engage with and depress the proper plunger to drive a space-blank into the line-space above the first wedge. The increase in this face of the cam is just enough to drive the space-blank into the line until it almost touches the wedge, this distance being nearly one-half the height of the type. During the passage of the parallel face $t^4$, Fig. 3, of this crown-cam $t$ the cam $w$, acting through the connecting-rod $w'$, Figs. 3, 4, 6, 10, and 11, slotted so as to pass around the shaft $s^4$, actuates the lever $w^2$, which for convenience is loosely journaled on the shaft $s^2$. This movement of the lever $w^2$ draws the rod $w^3$ rearward, and the withdrawing mechanism $w^4$, attached to said rod, hereinafter to be fully described, thereby removes the wedge from the line. Succeeding the withdrawal of the wedge the second increasing face $t^5$, Fig. 3, of the cam $t$ drives the space-blank home. During the passage of the decreasing face $t^6$, Fig. 6, the spring $t^7$, acting upon the lever $t^2$, returns the cross-head to its initial position by means of the connecting-rod $t^3$. As the cross-head rises the lip $F^{11}$, Fig. 3ᴬ, bearing on the under side of the lug $F^7$ of the depressed plunger, raises the plunger with it to its original position, where the spring $F^{12}$ maintains it independent of succeeding depressions of the cross-head until the block $F^6$ again calls it into action.

Following the operation above described the cam $p^2$ again causes the platform to be advanced toward the bumper $m'$, driving in the wedges to take up whatever looseness may have resulted from the space-blank inserted being less in thickness than the corresponding section of the wedge withdrawn and causing the line to again register with the corresponding space-case in the manner already described.

Immediately preceding each driving of the wedges against the bumper the following action takes place, (the description of the same being delayed to this point in order that it might be better understood:) The lever $j^{21}$ on the rock-shaft $j^{22}$, Figs. 5, 6, 10, and 20, is advanced to a position flush with the end of the bumper $m'$ by means of the spring $j^{23}$, said movement being permitted by a lower face of the cam $p^4$ presenting itself to the roller of the lever $j^{24}$. This position of the lever $j^{21}$ prevents any wedge that may be in position close to the end of the bumper from slipping off and thereby failing to be driven in with the others.

After the wedges have been again driven into the line and the block $p^3$ has caused the line-holder to be again moved along the platform until the first of the remaining wedges registers with the orifices of the space-magazine, as previously described, the same succession of operations of partially inserting the space-blank, withdrawing the wedge, driving the space-blank home and driving in the remaining wedges to take up any resulting looseness, are repeated until all the wedges have been replaced by space-blanks.

The mechanism for withdrawing the wedges is as follows, Figs. 4, 5, 6, 10, 20, and 21: Attached at one end to the frame of the space-magazine and the other to the stud $w^6$ is the guide $w^5$, on which slides the block $w^4$, which has its working parts on the under side. This block is shown in detail in Fig. 21. It has the flange $w^7$, the pawl $w^8$, the curved lever $w^9$, and the spring $w^{10}$, acting upon the two latter. This block is given a reciprocating movement on the guide by the cam $w$, Figs. 6 and 10, and the spring $w^{12}$, attached to the lever $w^2$, the said cam acting, as previously mentioned, through the connecting-rod $w'$, the lever $w^2$, and the rod $w^3$, attached to the block $w^4$ by means of the stud $w^{11}$, Fig. 21, projecting therefrom. As the decreasing face of this cam passes the roller on the connecting-rod $w'$ the spring $w^{12}$ draws the sliding block $w^4$ forward, whereupon the pawl $w^8$ clicks into the upper part of the notch $l^5$ in the large end of the wedge and holds it, as shown, against the flange $w^7$. As the block is drawn backward by the increasing face of the cam $w$ the wedge is carried with it. The block passes over the pawl $w^{13}$, Figs. 10 and 20, but the lower part of the wedge hits against it and presses it back against the force of the spring $w^{14}$ until it clicks into the lower half of the notch $l^5$ in the wedge. As the block is advanced by the decreasing face of the cam $w$, passing the roll on the connecting-rod $w'$, this pawl retains the wedge and carries its butt-end when released from the block to the side under the action of the spring $w^{14}$ in a path such that the end of the rod $j'$, Figs. 4, 5, 10, and 20, passes through the eye $l'$ in the wedge. The advancing of the block brings the lever $w^9$, Figs. 20 and 21, against the butt of the wedge; but as the same is held at one end by the pawl $w^{13}$ and at the other between the pawl $w^8$ and the flange $w^7$ the lever $w^9$ is pressed aside, and its point bears upon the side of the wedge. When the flange $w^7$ passes off the small end of the wedge, the lever $w^9$, under the action of the spring $w^{10}$, shoves the small end of the wedge aside out of the path of the next wedge to be withdrawn and in so doing returns to its normal position. In this manner the wedges are assembled upon the rod $j'$ in a position to be returned to their initial positions by mechanism to be described later. The last wedge having been removed from the line, the rearward movement of the platform immediately succeeding the removal of the wedge is no longer impeded by a wedge coming against the bumper, and the platform moves as far as permitted by the lever $p^{14}$, as described. In this rearward movement of the platform the lug $R^4$, Fig. 24, attached adjustably to the underside of the rack R, comes into contact with the pawl $R'$ and presses it downward until the projecting arm $R^6$ thereof clicks over onto the other face of the wedge-faced catch $R^2$, in which position the pawl is held by the tension of the spring $R^8$. The pawl being thus out of engagement with the rack, the platform is free to return to its initial position under the action of the spring $p^{11}$, as described. As the platform reaches its initial position the lug $R^4$, attached to the end of the rack, rides over the end $R^7$ of the pawl, depressing it and causing the projecting arm $R^6$ to trip over the catch $R^2$ and the pawl to come into position to engage the rack for the operation of the next line. The platform is thus brought back to its initial position, and the action of the cam $p^3$ through the lever $p^{21}$ and block $p^5$, as explained, following the last movement of the platform toward the bumper $m'$, just described, moves the line-holder to the end of the platform toward which it has been proceeding. In this position the line-holder is left standing.

The clutch $k^3$ is opened and the rotation of the shaft $s^4$ stopped after the substitution of space-blanks for wedges throughout the line by mechanism as follows: On the rock-shaft $p^9$, Figs. 3, 6, 8, and 12, to which the levers $p^6$, $p^7$, which give the rearward motion to the platform, are rigidly attached, as heretofore described, is loosely journaled the lever $k^{13}$. Formed on the hub of this lever is the lug $k^{16}$, Fig. 3, corresponding to the lug on the collar $k^{14}$, fixed on the said shaft $p^9$. Thus the shaft $p^9$ may oscillate without imparting motion to the lever $k^{13}$ until the lug on the collar strikes the lug on the lever. The lower end of the lever $k^{13}$ hangs opposite the pin $k^{11}$, Fig. 12, which controls the action of the clutch $k^3$, as already described. A weight $k^{15}$ on the end of a bell-crank arm of the lever $k^{13}$ holds the latter normally out of action upon the pin. When the last wedge has been withdrawn and the platform is permitted to make the full rearward movement, as described, the shaft $p^9$ is rocked backward until the lug on the collar $k^{14}$ bears against the lug $k^{16}$ on the lever $k^{13}$ and causes the latter to shove the pin $k^{11}$ forward against the hub of the driven member $k^{12}$ of the clutch $k^3$. In this position it meets the inclined segment on this clutch member and causes the clutch to be opened at the conclusion of the revolution.

The operations have been described by which the line-holder is carried as far as the end of the platform. Here it is left standing until the line-lever is again depressed, (at the completion of the following line,) when it is carried to the front of the galley, the line delivered on the galley, and the line-holder returned to the starting-point. This is accomplished in the following manner, Figs. 4, 5, 6, 9, 11, and 19: When the second line of the types has been assembled (the first line meanwhile being justified) and the line-lever L depressed, the shaft $s^2$, Figs. 4, 6, and 11, is given one revolution in the manner heretofore explained. On this shaft is the cam $o$, which by means of the lever $o'$, the shaft $o^2$, the lever $o^3$, and the link $o^4$, Fig. 19, operates the sliding block $o^5$. This block $o^5$ carries a trip $o^6$ and is supported by a T-tongue sliding in a T-groove in the rear of the galley-support $o^7$, (also Fig. 5,) said T-groove being continuous with that in the rear of edge of the platform hereinbefore mentioned. As the decreasing face of the cam $o$ passes the roller on the lever $o'$ the block $o^5$ is carried by the spring $o^8$, Fig. 10, along the platform until the trip $o^9$ Fig. 19, engages behind the line-holder, which was left standing at the end of the platform, at $o^9$, in Fig. 19, as described. As the block returns under the action of the increasing face of the cam $o$ the line-holder thus engaged is carried with it and brought to a point directly in front of the galley, with the ends $i^2$ of the line-holder opposite the side bars $o^{10}$ of the galley and the feet $i^8$, Fig. 27, on the bottom of the line-holder opposite the notches $o^{11}$. To provide against possible breakage to the machine in case a type or other material should by some means become lodged in the path of the line-holder, the connection between the lever $o'$ and the rock-shaft $o^2$ is not rigid, but is made by means of a stiff spring $o^{12}$, coiled about the shaft and connected at the lower end to the lever $o'$ and at its upper end to a set collar on the shaft $o^2$. This connection is stiff enough to normally transmit the motion of the cam $o$ to the line-holder, but will yield in case the latter meets any abnormal resistance.

That portion of the groove in the cam $q$, Fig. 9, from $q'$ to $q^1$ which has been passing the roller on the lever $q^3$ during the operation above described is concentric and therefore transmits no motion to the lever. This lever is pivoted at $q^4$ and is adjustably connected with the link $q^6$, Fig. 19, which is pivoted to the block $q^5$. This block $q^5$ slides on the curved guide-bar $q^7$ and carries the horizontally-projecting finger $q^8$, Figs. 10 and 19, which stands normally in such position that as the line-holder passes to its position in front of the galley the finger is received through the openings $i^7$, Fig. 26, in the flanged ends of the line-holder behind the line of type therein. When the line-holder comes to rest in front of the galley, the cam $q$ has made about a quarter of a revolution and that portion of its groove between $q^3$ and $q^{18}$, Fig. 9, is just beginning to act. This portion of the groove is of slightly-increasing radius, and its acting upon the lever $q^3$ is to give the block $q^5$, and with it the finger $q^8$, a forward movement for a distance sufficient to cause the finger to shove the line of type from the line-holder onto the galley against the types previously delivered or against a lead inserted as hereinafter described, or, in the case of the first line, against a block placed at the mouth of the galley. This galley is suitably supported in the inclined position shown in Figs. 1 and 11, so that the types may stand firmly thereon and have no tendency to fall backward. After the forward movement of the finger $q^8$, while the cam-groove from $q^{18}$ to $q^{19}$ is acting, the block $q^5$ is carried rapidly backward, and the finger $q^8$, bearing against the back of the recesses $i^7$ in the flanged ends of the line-holder, carries the latter backward on the tracks $q^9$ and $q^9$, Figs. 5, 9, 10, 11, and 19, which lead up to the return-track $q^{12}$. As the line-holder comes into position on this return-track the lip $i^{11}$, Figs. 26 and 27, is engaged by the threads of the continuously-revolving screw $q^{11}$, Figs. 5 and 10, which conveys the line-holder back toward the starting-point, the line-holder traveling along the return-track $q^{12}$, with its feet $i^8$ in the groove $q^{13}$. The concentric portion of the cam-groove between $q^{19}$ and $q^{20}$ holds the finger $q^8$ stationary until the line-holder has been started along the return-track $q^{12}$, when the remainder of the cam-groove returns the lever, block, and finger to their original positions. The line-holder, traveling along the return-track, arrives at the inclined tracks $q^{31}$, Fig. 12, down which it slides toward the position of $i^{12}$ in Fig. 5, there being notches in the track to allow the passage of the feet $i^8$ of the line-holder. The forward foot of the line-holder and the second notch are made wider than the other foot and its notch, so that the forward foot may pass by the first notch it comes to without entering it. The line-holder thus comes in turn into a position where it may be again brought into use when the preceding line-holders have been filled and moved away in the manner hereinbefore described.

I provide the mechanism described below for inserting leads between the lines of type in the galley, which may be thrown into or out of operation as desired. Carried beneath the galley-support is the receptacle for leads G, Figs. 1 and 11. This receptacle is a little higher than the leads and is open on one side for their insertion. The follower G', guided in a slot in the bottom of the receptacle and drawn forward by the cord $G^2$, passing over the pulley $G^3$ and having at its lower end a weight, feeds the leads forward. A slot the thickness of a lead is cut in the bottom of the galley-support at $G^4$ just in the rear of the line of type last delivered, through which slot the lead is forced by the plunger $G^5$. (Shown also in Fig. 3, the galley-support and lead-receptacle being removed.) This plunger consists of a piece of thin metal carried in guides $G^6$ and is connected by the rod $G^7$ with the bell-crank lever $G^8$. This lever is pivoted at $G^9$, Figs. 6 and 11, and is actuated forwardly by the cam $G^{10}$ on the shaft $s^2$ and rearwardly by the coiled spring $G^{11}$. The shaft $s^2$ makes, as heretofore described, one revolution as each line of type is delivered onto the galley. As the decreasing face of the cam $G^{10}$ passes the roller on the lever $G^8$ the coil-spring $G^{11}$ lowers the plunger $G^5$ and a lead is shoved forward above it and against the end of the receptacle. The return of the plunger under the action of the increasing face of the cam raises the lead to the level of the galley behind the last standing line of type and in front of the line just about to be delivered. The delivery of the latter line in the manner heretofore explained carries the lead with it, both the lead and the line behind it being moved far enough forward to be out of the way of the next lead to be inserted. If it is desired to have the type delivered on the galley solid—i. e., without leads—the rod $G^{12}$, Fig. 11, is shoved rearward until its end enters a hole $G^{13}$, Fig. 3, in the lower part of the plunger $G^5$. This maintains the plunger in an elevated position and the delivery of the leads is stopped, the cam $G^{10}$ meanwhile revolving idly.

The spacing-wedges, which I left in my description strung upon the rod $j'$ near the end thereof, are returned to the position from which they are to be used again by mechanism as follows: At the completion of the composition of the succeeding line of type the line-lever L being depressed sets into operation the shaft $s^2$, Figs. 4 and 6, as heretofore described. This shaft carries the crown-cam $j^{19}$, which acts on the roller of the lever $j^6$. This lever is connected at its upper end with the block $j^5$, Figs. 4 and 5, by means of the link $j^{25}$. This block slides in grooves formed at the lower edges of the bar $j^{20}$ and carries the trip $j^4$. As the cam $j^{19}$ revolves its increasing face drives this block backward—i. e., toward the left of the machine—and the trip $j^4$ passes under and beyond the wedges that have been strung on the end of the rod $j'$, as described, and trips up behind them. As the block returns under the action of the spring $j^7$, Fig. 6, the trip carries the wedges back with it and adds them to those already at $j$, Figs. 4 and 5, in position to be used again. The wedges used in one line being thus returned to position after that line has been justified and before the commencement of the assembling of the second line thereafter, it is apparent that there need be provided in the machine only enough wedges to fill any two lines.

The magazine for holding space-blanks, or, as I term it, the "space-magazine," and its attendant mechanism for feeding forward the space-blanks, the description of which, for convenience, has been delayed until now, are constructed as follows: $B^3$, Figs. 1, 5, and 11, is a frame rigidly secured to a fixed support $B^2$ and to which the plunger-frame F, before mentioned, is attached. The space-magazine consists of a bank of cases somewhat similar to those for holding the types, one for each of the different-sized space-blanks used, say nine altogether. It fits into the frame just mentioned, and its position lengthwise thereof is adjusted by the set-screw and jam-nuts $B^4$, Figs. 3, 5, and 10. Hinged at $D'$, Figs. 1, 5, 9, and 18, is the framework D, (also Figs. 3 and 11,) consisting of the four rods $D^2$ $D^2$ $D^3$ $D^3$, attached by nuts to the end pieces $D^4$ and $D^5$. Between the lower rods $D^2$ and $D^2$ are placed the thin slats $D^6$, preferably made of steel, mortised at the ends into the said end pieces $D^4$ and $D^5$. The end $D^5$ of the framework rests on the space-magazine frame $B^3$ near its forward end, and the framework is so placed that each of the slats is directly above its corresponding case in the space-magazine. Carried upon these slats are the followers $D^7$, Fig. 18, fitting loosely thereon and projecting down into the cases behind the space-blanks. Cords attached to these followers (one cord to each follower) pass successively over the rollers $D^8$, $D^9$, $D^{10}$, and $D^{11}$, Figs. 1, 3, 5, 9, and 18. The last-mentioned rollers being on the inside of the casting $B^2$ carry at their ends the weights $D^{12}$. The space-blanks are thus fed up by the weights $D^{12}$ as those in front are ejected, friction being sufficient to hold in place the front space-blank, which is over the orifice in the bottom of the case. Upon the rods $D^2$ and $D^2$ is carried the cross-head $D^{13}$, Figs. 1 and 18, which is normally at the front of the frame, but which being slid back engages each of the followers and collects them at the rear end of the frame. This cross-head being held in this rear position by a hook $D^{14}$, the frame may be turned up at the hinge $D'$ to remove the space-magazine and replace it by a replenished one.

It is desirable that the space-blanks used in this machine should have their feet slightly tapered, so as to compensate for any slight inaccuracy in the presentation of the line-spaces to the orifices of the space-cases.

The first time the wedges are driven into the line by the fixed bumper $m'$ the tension of the spring $p^{11}$ is exerted upon the full complement of wedges. Each succeeding time they are driven in this tension of the spring $p^1$ acts upon one less wedge, making the amount of pressure upon each wedge then remaining in the line proportionally greater. This condition would result in uneven spacing, causing the use of several sizes of space-blanks, the last wedge driven in being liable to require a space-blank some size larger than the first. It is desirable, of course, that the line should be as evenly spaced as practicable, and in order to overcome the above defect the bumpers $m$ and $m'$ are placed somewhat obliquely with reference to the line, the end nearest the space-orifices being nearest the line. The result of thus skewing the bumpers is to cause the first wedges in the line to be driven in farther than the succeeding ones, thus causing the latter wedges when forced in with an increased pressure to be driven in substantially the same distance as the first ones, and the bumpers are so set that in an average line the increased distance to which these latter wedges must be driven is proportional to the increased pressure exerted upon them. It will be noticed that that face of the teeth in the rack against which the pawl bears is not at right angles to the platform, but recedes toward the rear thereof. This is so that the platform will invariably return, after the bumping operation, at least the distance of such receding so that, as the line-holder is advanced along the platform, wedges near the rear end of the line (which, owing to the above described obliqueness of the platform, project rearward farther than the forward wedges) will not impinge against the platform and prevent proper action. The effect which this skewing of the bumpers produces might also be accomplished by decreasing the tension of the spring $p^{11}$ by suitable means as each wedge is removed.

The machine is driven by a belt running in tight and loose pulleys $u$, Fig. 2, on the shaft $s$, a shipper of ordinary type T being provided to change the belt from one to the other. Gears $j^{17}$ and $j^{18}$, Fig. 6, drive the shaft $s'$. A belt $r^2$ over the pulleys $u'$ and $u^2$, tensioned by the pulley $u^{10}$, transmits power to the shaft $s^3$. The ejector-cylinders $e$ and $e'$ are driven by the belt $r$, Figs. 4 and 7, running from the pulley $u^3$ over the idle-pulleys $u^8$, and a crossed belt from another periphery of the pulley $e^4$ drives the roller $g^{13}$, as elsewhere stated. From the pulley $u^4$ on shaft $s'$, Figs. 4 and 6, a belt drives the return-screw $q^{11}$. The wheels $h$ and $h'$, geared together, as described, are driven by a belt from the pulley $u^5$ (also Fig. 6) on the jack-shaft $u^{11}$, on the other end of which is the pulley $u^6$, driven by a belt from the pulley $u^7$ on the shaft $s^3$.

Breakage is prevented in case anything should get in the way of moving parts of the machine by a throw-out connection between the main pulley and its shaft, which opens and allows the pulley to run loosely whenever the total resistance of the machine is greater than a predetermined maximum. This throw-out connection is best shown in Figs. 2 and 7. A pawl T' is secured to a boss on the main pulley $u$, which is journaled loosely on its shaft $s$. This pawl bears against the projection $T^3$ on a collar rigidly secured to the shaft $s$. As the pulley rotates its motion is transmitted to the shaft through this pawl and collar. The bearing-face $T^2$ of the pawl is slightly beveled and tends to slide off of the projection $T^3$, but is ordinarily held thereon by a spring-actuated detent in a recess in the boss beneath the pawl, said detent having a tapered or pointed head bearing in the depression $T^4$ (Fig. 7 only) in the pawl. When for any reason the total resistance of the machine exceeds a predetermined maximum, this spring will no longer be able to hold the pawl against the collar, but will allow it to be forced out of engagement. When once out of engagement, the head of the detent springs into a second depression $T^5$ and holds the pawl away from the collar, allowing the pulley to revolve loosely on its shaft until the trouble is corrected and the pawl set back by hand into engaging position.

Many of the mechanisms herein described are capable of great variation without in the least departing from my invention. For instance, instead of the line-holder shifting to register with the space-case and advancing the wedges against the bumper, the means could be inverted and the space-case brought to the line and the bumper to the wedges. The delivery mechanism of the space-magazine and the plunger mechanism may be varied so long as they maintain their capacity for delivering the proper space-blanks into the corresponding line-space. In long lines of type it may sometimes be desirable to so time the reciprocation of the platform toward the bumper that two or more space-blanks will be inserted between the tightening of the wedges. The arrangements for actuating the various parts might be greatly changed. Numerous other equivalents and mechanical modifications will readily suggest themselves to one familiar with the art to which this appertains, it being understood that my invention is not confined to the specific constructions exemplified. Nor must the mention in this specification of certain equivalent devices and mechanisms be construed to exclude others not mentioned, said mention being simply by way of illustration and not an enumeration.

Having thus described my invention, what I claim as new, and desire to secure by Letters Patent, is—

1. In a type setting and justifying machine, in combination, a line-holder, temporary spreading spacing devices adapted to be inserted between types as they are composed therein, mechanism for inserting said devices in the line, retarding mechanism connecting said inserting mechanism with a controlling-key whereby an actuation of the key causes the operation of the inserting mechanism after the lapse of a predetermined interval of time and whereby a second impulse of the key before the completion of the insertion of the first spacing device will be communicated to the inserting mechanism and cause the insertion of a second spacing device, for the purpose specified.

2. In a type-setting mechanism, in combination, a set of operating-keys, a set of type-cases, mechanism controlled by said keys for ejecting types from said cases, converging chutes leading from the points of ejection to a common point, each of said chutes having a roller at its upper end against which the foot end of the ejected type falls, for the purpose specified.

3. In a type-setting mechanism, in combination, a set of finger-keys, a set of type-cases, a set of bars capable of ejecting types from their cases, said bars having teeth upon their upper and under sides and being movable longitudinally and having some part thereof capable of being raised by a movement other than its longitudinal movement into connection with a revolving gear-cylinder above said bars and extending across them, mechanism operated by said finger-keys for so raising said ejector-bars into connection with said cylinder whereby said ejector-bars are moved to eject types from their corresponding cases, a second gear-cylinder below said bars and extending across them, and means whereby said ejector-bars automatically drop into connection with said latter cylinder when they reach the forward end of their stroke whereby they are returned to their original positions, substantially as and for the purposes specified.

4. In a type-setting mechanism, in combination, a set of finger-keys, a set of corresponding type-cases, a set of bars capable of longitudinal movement for ejecting types from their cases, a revolving member extending across said bars above the same and one extending across the bars below them, said bars having some portion thereof capable of a movement other than their longitudinal movement whereby they may be raised into connection with said upper revolving member, raising-fingers located beneath said bars, mechanism connecting said raising-fingers with the finger-keys whereby an actuation of a finger-key causes its corresponding raising-finger to raise an ejector-bar into connection with the upper revolving member and hold it there until it has completed its forward stroke, a notch on the under side of each ejector-bar so situated that it comes over the raising-finger when the bar has ejected its type from its case, said notch being of such dimensions that when it comes over the raising-finger the ejector-bar drops out of connection with the upper revolving member and into connection with the lower revolving member whereby the ejector-bar is returned to its original position, and means for releasing the connection between the lower revolving member and the said ejector-bar when the latter shall have returned to its said original position, substantially as and for the purpose specified.

5. In a type-setting mechanism, the combination of a finger-key, a pivoted raising-finger, an ejector-bar having a raisable portion above said raising-finger, a revolving member above said bar, mechanism connecting said raising-finger with a finger-key whereby a depression of the finger-key causes the operative end of the raising-finger to raise its corresponding ejector-bar into connection with the said revolving member, the perpendicular distance between the pivot of the raising-finger and its corresponding ejector-bar when elevated bearing such proportion to the length of the raising-finger between its pivot and its operative end that when the raising-finger raises the ejector-bar into contact with the revolving member the raising-finger will be in a position near enough vertical to remain elevated and hold the ejector-bar in contact with the revolving member after the depressing force is removed from the finger-key, for the purpose specified.

6. In a type-setting mechanism, the ejector-bar $d$, formed with an oscillatable tail $d'$, said tail having gear-teeth upon its upper and lower sides, in combination with the toothed revolving members $e$ and $e'$, substantially as described.

7. In a type-setting mechanism, in combination, a set of finger-keys, a corresponding set of type-cases, there being one type-case for each finger-key and one or more additional type-cases for some of the keys of the most commonly used characters, an ejector-bar for each type-case adapted to eject types therefrom, mechanism connecting the finger-keys with corresponding ejector-bars whereby a depression of a key causes the ejection of its corresponding type, and a set of individual shifting mechanisms each corresponding to a character of which there are additional type-cases and each operating to independently shift the mechanism connecting a key of a character to which there corresponds more than one type-case with the ejector-bars for said cases, whereby one key may operate to cause the ejection of types from one type-case until they are exhausted and then its connecting mechanism may be shifted and it may cause the ejection of types from another type-case, for the purpose specified.

8. In a type-setting mechanism, in combination, a set of ejector-bars having raisable portions, a corresponding set of raising-fingers, each operating upon the raisable portion of its corresponding ejector-bar, a shifting rod operating to change the relative position existing between a raising-finger and the ejector-bar whereby said raising-finger may operate successively upon more than one ejector-bar, for the purpose specified.

9. In a type-setting mechanism, in combination, a set of finger-keys, a set of rocking shafts connected therewith, a set of raising-fingers actuated by said rocking shafts, said raising-fingers being loosely journaled upon a shaft and being operative upon the raisable portions of a set of ejector-bars, and one or more shifting rods whereby one or more of said raising-fingers may be made to successively operate upon more than one of said ejector-bars, for the purpose specified.

10. In a type-setting mechanism, a type-case from off the bottom of which types may be ejected singly in a path which is substantially a straight prolongation of the position occupied by the bottom type in the case, said bottom being formed substantially as described and having some portion which is out of contact with the lowest type when the same lies flatly on the bottom of the case, whereby the types are prevented from descending askew, for the purpose specified.

11. In a type-setting mechanism, a type-case from off the bottom of which types may be ejected singly in substantially the same horizontal plane in which the bottom type lies, said bottom being made with a depression therein, whereby the types are prevented from coming down askew and are allowed to descend evenly, substantially as described and for the purpose specified.

12. In a type-setting mechanism, a type-case from off the bottom of which types may be ejected singly, the forward part of said bottom having a groove therein, said groove being located far enough back from the front edge of the bottom so that there is a portion of the said bottom forming a wall in front of the groove, said groove operating to insure the descension of the type evenly, whereby the sticking of the lowest type in a position where the ejector-bar cannot eject it is prevented, in combination with an ejector-bar adapted to enter the type-case from behind and shove the lowest type therefrom, substantially as described.

13. In a type-setting mechanism, a bank of type-cases having rigid sides, back and partitions and a removable end, said end being held in place by a pin passing through each side of the case and into said end and held therein by a spring to which it is attached, in combination with mechanism operating upon the spring and adapted to withdraw the pin from the said end and hold it out of contact therewith, whereby the said end may be removed, substantially as described.

14. In a type-setting mechanism, the bank of type-cases P having the removable end $b$, in combination with the spring $b^2$ and pin $b'$ projecting from said spring through a hole in the side of the bank and into a hole in the end $b$, and the wedge-faced bar $b^4$ adapted to come under the said spring $b^2$, substantially as described and for the purpose specified.

15. In a type-setting mechanism, a bank of type-cases held in a substantially vertical position and being capable of being removed from its supports by first being tipped backward at its upper end, in combination with a front hinged at its lower end and capable of backward movement at its upper end, and a stop to limit said backward movement, substantially as described.

16. In a type-setting mechanism, the chute-plate $g^{15}$, constructed with channels therein, said channels being so disposed that they form chutes leading from the various points near the top of said chute-plate to a common point near the bottom thereof, in combination with a ledge $g$ hinged to the top of said chute-plate, guides $g'$ secured to said ledge, the spaces between said guides forming continuations of the channels in the chute-plate, and the piece $g^{11}$ secured to said guides, substantially as described.

17. In a type-setting mechanism, in combination, type-cases, from which types are ejected singly, a ledge to receive and support the face end of a type so ejected, guides between which said type is free to fall and a roller so placed and revolved as to receive the falling end of said type and assist the downward movement thereof, for the purpose specified.

18. In a type-setting mechanism, chutes converging into a common channel through which types may fall, in combination with a wheel placed tangentially to the line of travel of types through said common channel, said wheel being on an axis capable of translation in such manner that the distance between the circumference of the wheel and the opposite wall of the channel may be varied, for the purpose specified.

19. In a type-setting mechanism, in combination, the wheel $h$, the oscillatable support $h^5$ carrying the same, and the gears $h^3$ and $h^4$—the axis of rotation of said gear $h^4$ being substantially the same as the axis of oscillation of said support $h^5$, substantially as and for the purpose specified.

20. In a type-setting mechanism, in combination with a channel down which types may fall, the yielding wheel $h$, and the advancing wheel $h'$, said wheels being so placed that a type passing down said channel may come into contact with the wheel $h'$ before leaving the wheel $h$, substantially as and for the purpose specified.

21. In a type-setting mechanism, in combination, the wheel $h$, the shaft $h^2$, the gears $h^3$ and $h^4$, the gears $h^9$ and $h^{10}$, the shaft $h^{11}$, and the wheel $h'$, substantially as described.

22. In a type-setting mechanism, a movable line-holder having a flange thereon against which a type may be set up, in combination with a revolving wiper-wheel having a plurality of arms whereby one of said arms is adapted to receive the foot end of a type descending from above and lower the type while the following arm advances the type and thereby moves the line-holder forward a distance equal to the thickness of said type, for the purpose specified.

23. In a type-setting mechanism, in combination, a traveling line-holder, a bar capable of a limited movement with the line-holder, means whereby said bar is connected with the line-holder and moved with it a certain predetermined distance and then passes out of moving connection with said line-holder and is held stationary until said line-holder has moved a predetermined additional distance when said bar is released, a spring serving to retract said bar when released and means whereby the retraction of said bar causes a signal to be given indicating that the line-holder has reached a certain predetermined point, for the purpose specified.

24. In a type-setting mechanism, a traveling line-holder $i$ in combination with a bar $z$ capable of a limited longitudinal movement, projections $z^3$ and $z'$ upon said bar, a supporting-surface for said bar having a depression $z^4$ therein, a spring $z^2$ tending to retract said bar, a hammer $z^5$ arranged to strike a gong $z^6$ when said bar is retracted, substantially as described.

25. In a mechanism for justifying a line of type, in combination, one or more line-holders adapted to receive and hold a line of type and spacing devices, and to be moved successively to a position where it is filled with type and spacing devices, to a position where space-blanks are substituted for the spacing devices, to a position where the line of type is delivered from the line-holder, and thence again to the first position mentioned; means whereby said line-holder is automatically carried to these successive positions; one or more spacing devices independent of said line-holder, capable of being inserted between types in the line-holder and of being withdrawn from the line-holder and returned to the position from which they were inserted into the line; and means for inserting such spacing devices, for withdrawing them and for returning them to the position from which they were inserted in the line, for the purpose specified.

26. In a mechanism for justifying a line of type, in combination with two or more traveling line-holders, a series of independent wedges supported in position to be inserted between types in the line of one of said line-holders, mechanism for inserting the same, mechanism for withdrawing said wedges and supporting them independent of said line-holder, and means for returning them to position for insertion between the types of a succeeding line-holder, for the purpose specified.

27. In a justifying mechanism, the combination of a traveling line-holder, wedges interposed between the words thereon and carried therewith, said wedges having eyes adapted to receive a guide, mechanism for withdrawing said wedges, a guide adapted to engage with said eyes, and means for propelling said wedges along said guide, for the purpose described.

28. The combination of a reciprocating mechanism adapted to support a line-holder; a space-magazine having discharge-orifices; a line-holder adapted to receive and contain and support a line of types and wedges; a bumper toward which the reciprocating mechanism moves and against which the wedges impinge; and mechanism affording sufficient retrograde movement of the line-holder to cause the line of type to register with one of the orifices of the space-magazine, for the purpose specified.

29. In a justifying mechanism, the combination of a traveling line-holder, a reciprocating platform capable of supporting said line-holder, a rack and pawl serving to sustain the platform temporarily against return movement, for the purpose specified.

30. In a justifying mechanism, the combination of a traveling line-holder carrying types and temporary spacing devices, means for moving the same crosswise of the line, a rack and pawl serving to sustain the same temporarily against return movement, said rack having notches corresponding with the orifices of a space-magazine, for the purpose described.

31. In a justifying mechanism, in combination, a reciprocating platform, means for supporting thereon a line of types and spacing devices, a detent serving to sustain the platform temporarily against return movement, mechanism for removing the spacing devices from the line, and mechanism for throwing said detent out of action after the last spacing device has been removed, for the purpose specified.

32. In a justifying mechanism, a traveling line-holder adapted to carry a line of type upon its upper side, in combination with a reciprocating bar beneath said line-holder, said bar carrying a trip adapted to engage with said line-holder whereby an advancement of the bar advances the line-holder while a retraction of the bar does not retract the line-holder, substantially as specified.

33. In a type-justifying mechanism, in combination, a line-holder, spacing-wedges between types in a line contained therein, a bumper adapted to drive in said wedges and having its bumping-face at an angle to the line of type, said angle being unchanged during the operation of bumping, whereby wedges near one end of the line are driven farther in than wedges near the other end, for the purpose specified.

34. In a justifying mechanism, in combination, a line-holder, temporary spreading spacing devices between types in a line contained therein, means for causing said devices to increase the line-spaces, means for substituting space-blanks for the spacing devices, and means for preventing this substitution when the increase of line-space is more than or less than a predetermined amount, respectively, for the purpose specified.

35. In a type-justifying mechanism, in combination, a line-holder, temporary spacing devices between types in a line contained therein and adapted to spread the line by being moved through it, means for moving said devices through the line, means for advancing the line-holder which are thrown into operation only when the wedges have been advanced more than a predetermined minimum and less than a predetermined maximum, for the purpose specified.

36. In a type-justifying mechanism, a series of wedges and mechanism for inserting the same thin end foremost in a direction transverse to the length of a type into a line of type being assembled, in combination with a wiper-wheel adapted to force forward the line set up, and means for diverting the point of a wedge being inserted from the arms of the wiper-wheel while permitting the insertion of the thin end of the wedge between the wiper-wheel and the type, for the purpose specified.

37. In a justifying mechanism, a wedge less in height than the types with which it is to be used, and having a notch near its large end, substantially as described.

38. In a justifying mechanism, a wedge less in height than the types with which it is to be used, and having an eye through it, substantially as described.

39. In a justifying mechanism, a wedge less in height than the types with which it is to be used and having an eye through it and a notch near the large end thereof, substantially as described.

40. In a justifying mechanism, a wedge having a straight extension at each end thereof, and having a notch in the larger of said extensions, substantially as described.

41. In a justifying mechanism, a wedge having a straight extension at each end thereof, and having an eye through the larger one of said extensions, substantially as described.

42. In a justifying mechanism, a wedge having an extension at each end thereof, and having an eye through, and a notch in, the larger one of said extensions, substantially as described.

43. In a justifying mechanism, a traveling line-holder having recessed flanges at the ends thereof and a rabbeted edge, substantially as described.

44. In a justifying mechanism, a traveling line-holder having recessed flanges at the ends thereof, and having feet on the under side thereof, substantially as described.

45. In a justifying mechanism, a traveling line-holder adapted to carry a line of type and wedges interposed therein and engaging therewith, said wedges being adapted to be moved across the line-holder through the line, said line-holder having a surface adapted to stand under the center of gravity of said wedges when resting in any engaging position upon the same, whereby gravity holds said wedges in place, for the purpose specified.

46. In a justifying mechanism having a series of space-blanks and wedges tapering to correspond therewith, a line-holder having a rabbet along its front edge, and adapted to carry a line of type thereon, and having extending from said rabbet a plain surface at least as many times greater than the width of the rabbet as there are different-sized space-blanks whereby the wedges corresponding to said space-blanks may be supported by said surface, substantially as and for the purpose specified.

47. In a justifying mechanism, the combination with a space-magazine adapted to hold a graduated series of space-blanks in order across the same, and a series of wedges tapering to correspond therewith, of a line-holder adapted to support a line of type, and having a surface extending back of said line a distance at least as great as the internal width of said space-magazine, and thereby adapted to support said wedges and permit the same to rest by gravity upon said surface, substantially as and for the purpose specified.

48. In a justifying mechanism, a traveling line-holder $i$, having the recessed flange $i^2$ at each end thereof, having the rabbeted edge $i^5$, and having the feet $i^3$ and $i^8$, substantially as described.

49. In a justifying mechanism, the wedge-withdrawing device consisting of the block $w^4$ having the flange $w^7$, the pawl $w^8$, and the lever $w^9$, substantially as described.

50. In a justifying mechanism, the wedge-withdrawing mechanism, consisting of the block $w^4$, the guide $w^5$, the pawl $w^{13}$, and the rod $j'$, substantially as described.

51. In a justifying mechanism, the combination with a wedge having an eye through it, of the rod $j'$ and the sliding block $j^5$ carrying the trip $j^4$, substantially as described.

52. In a justifying mechanism, in combination with a space-magazine, the space-plungers F', the cross-head $F^5$ carrying the block $F^6$ to engage said plungers, substantially in the manner described.

53. In combination with the space-magazine of a type-justifying mechanism, the plunger-frame F, the plungers F' having lugs $F^7$, the cross-head $F^5$ slidable longitudinally on said frame, the block $F^6$ slidable transversely in said cross-head and operating to engage one of said lugs $F^7$, substantially as described.

54. In a justifying mechanism, in combination, the space-magazine, the vertically-movable cross-head $F^5$ carrying the sliding block $F^6$, said block being so connected with the platform that, while having an independent vertical movement, it partakes of the transverse movement of said platform, substantially in the manner described.

55. In a justifying mechanism, in combination with the platform $p$, the rack R, the pawl R', the catch $R^2$, substantially as described.

56. In a justifying mechanism, in combination with the platform $p$, the rack R, the pawl R', having the arm $R^7$, and the lug $R^4$, substantially as described.

57. In a justifying mechanism, in combination, the bumper $m'$, the platform $p$, movable toward said bumper, for the purpose specified.

58. In a justifying mechanism, in combination, the bumper $m'$, the platform $p$, the rack R, and the pawl R', substantially as described.

59. In a justifying mechanism, in combination with the movable bumper $m$, the raising-bar $x$ partaking of the motion of said movable bumper, the rod $x^2$, the lever $x^3$, the shaft $x^4$ and the detent $x^5$, substantially as described.

60. In a justifying mechanism, in combination with the space-magazine, the framework D carrying the slats $D^6$ upon which are hung the followers $D'$, said followers being pulled forward by cords to which weights are attached, substantially in the manner described.

61. In a justifying mechanism, the platform $p$, the springs $p^{11}$ and $p^{12}$ suitably connected with the platform and tending to move it in opposite directions, one of the said springs being stronger than the other, in combination with mechanism adapted to counteract the force of the stronger spring whereby the platform is moved by the weaker spring in the direction of its tendency, for the purpose described.

62. In a justifying mechanism, in combination, the platform $p$, the lever $p^{14}$ connected therewith loosely whereby it may move the platform in one direction but not in the other, means acting upon said lever and tending to pull the platform forward, weaker means tending to pull the platform rearward, and a cam operating to move said lever in the direction to overcome its pull upon the platform whereby the latter is moved by the weaker means, for the purpose specified.

63. In a justifying mechanism, in combination, the platform $p$, the lever $p^7$ connected therewith, the spring $p^{11}$ acting through said lever and urging the platform rearward, the lever $p^{14}$, and the spring $p^{12}$ acting upon the latter lever and urging the platform forward, substantially as described.

64. In a justifying mechanism, in combination, the guide $j^3$, the block $j^8$ slidable along the same, the lever $j^{10}$ connected with said block, the cam $j^{11}$ forcing said lever in one direction, and the spring $j^{13}$ forcing it in the other direction, substantially as described and for the purpose specified.

65. In a justifying mechanism, the wiper-wheel $h'$, having the substantially conical face $h^{14}$, substantially as described and for the purpose specified.

66. In a justifying mechanism, a traveling line-holder having recessed ends, a galley, a finger projecting across the width of the galley in such position that as the line-holder advances it will pass through the recesses in the ends thereof and be in a position behind the line of type therein, in combination with mechanism adapted to advance said finger and thereby move the line of type from the line-holder into the galley and then retract said finger back of its original point of rest and thereby carry the line-holder with it, substantially as and for the purpose described.

67. In a justifying mechanism, the finger $q^8$ extending across the mouth of a galley and adapted to enter behind the line of type carried by a traveling line-holder, the lever $q$ connected with said finger, and the cam $q$ so operating said finger that it moves forward shoving the line of type from the line-holder into a galley, and then moves rearward back of its original point of rest and carries the line-holder with it, substantially as described.

68. In a justifying mechanism, a traveling line-holder adapted to support a line of type upon its upper side, said line-holder having feet $i^8$ adapted to slide in a groove $i^9$ in the track $i^{13}$, in combination with rails $i^3$ and $i^4$ adapted to confine the line of type supported upon the upper side of said line-holder, substantially as described.

69. In a justifying mechanism, a line-holder having a recessed flange or wall against which the first type in the line bears, in combination with means for preventing said first type from entering the recess in said wall as it is being inserted in the line-holder, for the purpose specified.

70. In a justifying mechanism, in combination, a traveling line-holder, a track $q^{12}$ along which said line-holder may slide, a revolving screw operating to propel said line-holder along said track, substantially as described.

71. In a type-justifying mechanism, in combination, a line of type, mechanism for inserting spacing devices between types in the line, a lever $c^6$ operating to throw said mechanism into action, a bar $c^3$ having a lug $c^5$ thereon which may be brought into contact with said lever and cause it to operate, means for retracting said lug from engagement with said lever, a revolving shaft $c^4$, and mechanism actuated when desired causing said bar $c^3$ to be brought into engagement with said shaft when the lug on the said bar $c^3$ is out of engagement with said lever $c^6$, substantially as described.

FRANCIS B. CONVERSE, JR.

Witnesses:
CYRUS S. BATES,
LAVENIA S. BATES.